US012729691B2

(12) United States Patent
Oh et al.

(10) Patent No.: US 12,729,691 B2
(45) Date of Patent: Sep. 8, 2026

(54) TURBO COMPRESSOR

(71) Applicant: LG ELECTRONICS INC., Seoul (KR)

(72) Inventors: Junchul Oh, Seoul (KR); Changgook Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/866,715

(22) PCT Filed: Jul. 26, 2022

(86) PCT No.: PCT/KR2022/010930
§ 371 (c)(1),
(2) Date: Nov. 18, 2024

(87) PCT Pub. No.: WO2023/224168
PCT Pub. Date: Nov. 23, 2023

(65) Prior Publication Data

US 2025/0347288 A1 Nov. 13, 2025

(30) Foreign Application Priority Data

May 20, 2022 (KR) ........................ 10-2022-0062214
May 20, 2022 (KR) ........................ 10-2022-0062215

(51) Int. Cl.
*F04D 29/057* (2006.01)
*F04D 17/10* (2006.01)
(Continued)

(52) U.S. Cl.
CPC ........... *F04D 29/057* (2013.01); *F04D 17/10* (2013.01); *F04D 29/0513* (2013.01);
(Continued)

(58) Field of Classification Search
CPC ............... F04D 29/0513; F04D 29/057; F04D 29/5806; F04D 25/06; F04D 17/10;
(Continued)

(56) References Cited

U.S. PATENT DOCUMENTS 9,206,840 B2 * 12/2015 Omori ..................... F16C 43/02
11,306,726 B2 * 4/2022 Perevozchikov ....... F04D 29/60
(Continued)

FOREIGN PATENT DOCUMENTS

CN 114165463 3/2022
EP 2778448 9/2014
(Continued)

OTHER PUBLICATIONS

JP-2023060670—translation (Year: 2023).*
(Continued)

*Primary Examiner* — Courtney D Heinle
*Assistant Examiner* — Behnoush Haghighian
(74) *Attorney, Agent, or Firm* — KED & ASSOCIATES

(57) ABSTRACT

Disclosed is a turbo compressor. A rotary shaft is installed in a housing to be rotatable. A bearing supports the rotary shaft to be rotatable. A bearing housing is coupled to the housing and supports the bearing. The bearing includes a journal bearing and a journal bearing safety device. The journal bearing is attached to the inner circumference of the bearing housing, and includes a gas foil bearing so as to support the load of the rotary shaft in the radial direction. The journal bearing safety device is provided in the bearing housing, and restricts the movement distance of the rotary shaft in the radial direction to be within the elastic deformation range of the journal bearing. According to this configuration, damage to the journal bearing can be prevented.

16 Claims, 23 Drawing Sheets

(51) Int. Cl.

| | |
|---|---|
| ***F04D 29/051*** | (2006.01) |
| ***F16C 17/24*** | (2006.01) |
| *F04D 25/06* | (2006.01) |
| *F04D 29/056* | (2006.01) |
| *F04D 29/28* | (2006.01) |
| *F04D 29/58* | (2006.01) |
| *F16C 17/02* | (2006.01) |

(52) U.S. Cl.
CPC .............. *F16C 17/24* (2013.01); *F04D 25/06* (2013.01); *F04D 29/056* (2013.01); *F04D 29/286* (2013.01); *F04D 29/5806* (2013.01); *F16C 17/024* (2013.01); *F16C 2360/24* (2013.01)

(58) Field of Classification Search
CPC ...... F04D 17/12; F04D 17/122; F04D 17/125; F16C 17/024
See application file for complete search history.

(56) References Cited

U.S. PATENT DOCUMENTS

| | | | | |
|---|---|---|---|---|
| 12,031,549 | B2 * | 7/2024 | Kim | F04D 29/056 |
| 2011/0171020 | A1 | 7/2011 | Spathias et al. | |
| 2014/0241653 | A1 * | 8/2014 | Omori | F16C 43/02<br>384/106 |
| 2020/0291953 | A1 * | 9/2020 | Perevozchikov | F25B 31/006 |
| 2022/0065513 | A1 | 3/2022 | Oakley et al. | |
| 2023/0106824 | A1 * | 4/2023 | Kim | F04D 29/441<br>415/177 |

FOREIGN PATENT DOCUMENTS

| | | | | |
|---|---|---|---|---|
| EP | 3348839 | | 7/2018 | |
| JP | 11-013687 | | 1/1999 | |
| JP | 2013-100885 | | 5/2013 | |
| JP | 2023060670 | A * | 4/2023 | F04D 29/102 |
| KR | 10-0253247 | | 5/2000 | |
| KR | 10-2005-0097247 | | 10/2005 | |
| KR | 10-1746896 | | 6/2017 | |
| KR | 10-2021-0089661 | | 7/2021 | |
| KR | 10-2021-0132350 | | 11/2021 | |

OTHER PUBLICATIONS

International Search Report dated Feb. 15, 2023 issued in Application No. PCT/KR2022/010930.

European Search Report issued in Application No. 22942832.1 dated Oct. 1, 2025.

Supplementary European Search Report dated Jul. 18, 2025, issued in Application No. 22942832.1.

* cited by examiner 113b
1232(123)
112a
112(110)
112b
115b
136
114b
1282
(128)
118
1242
(124)
120
119
1221
1211
121
122
1212
129
II
100
116
117
1281(128)
115a
114a
130
113a
123a
123b
1231
(123)
111b
111a
111
(110)
AXIAL
DIRECTION
RADIAL
DIRECTION 213b
2232(223)
212(210)
212a
212b
215b
236
214b
2282
(228)
218
2242
(224)
220
219
2221
2211
221
222
2212
XVI
229
200
216
217
2242
(224)
2281(228)
215a
214a
230
231
213a
223a
223b
2231
(223)
211b
211a
211
(210)
AXIAL
DIRECTION
RADIAL
DIRECTION

TURBO COMPRESSOR

CROSS-REFERENCE TO RELATED PATENT APPLICATIONS

This application is a U.S. National Stage Application under 35 U.S.C. § 371 of PCT Application No. PCT/KR2022/010930, filed Jul. 26, 2022, which claims priority to Korean Patent Application Nos. 10-2022-0062214 and 10-2022-0062215, both filed May 20, 2022, whose entire disclosures are hereby incorporated by reference.

TECHNICAL FIELD

The present disclosure relates to a turbo compressor having a bearing safety device.

BACKGROUND ART

In general, a compressor is a device widely used in home appliances and industries. The compressor receives power from a power generation device such as an electric motor or turbine to compress air, refrigerant, or other various working gases.

The compressor includes a turbo compressor. The turbo compressor applies centrifugal force by rotating a disk wheel (hereinafter, referred to as an impeller), and converts some of velocity energy into pressure energy to compress a working gas.

For example, a turbo compressor may be used in a chiller system that supplies chilled water to where it is needed. The chiller system cools chilled water by heat exchange between refrigerant circulating in a refrigerant cycle and the chilled water circulating in a corresponding place where it is needed.

Meanwhile, Korean Patent Registration Publication No. 10-1746896 (hereinafter, Patent Document 1) discloses an exhaust gas turbo charger having an element for axially fixing a shaft when a compressor wheel ruptures.

Patent Document 1 is an invention regarding a retaining ring that fixes a rotary shaft in an axial direction when a compressor turbine and impeller are damaged.

According to the invention of Patent Document 1, when turbine and impeller of a compressor are damaged, damaged components may be scattered to outside a housing and difficult to be disassembled. To solve these problems, the retaining ring fixes the shaft in the axial direction to suppress separation of the shaft, and facilitate disassembly and assembly of the impeller and turbine when the impeller and turbine are damaged.

However, Patent Document 1 has a problem in that additional components such as the retaining ring and a retaining ring housing should be assembled, which increases the number of components and manufacturing costs.

Additionally, there is a problem in that it is difficult to align the retaining ring and the shaft when assembling the retaining ring.

Meanwhile, a multi-stage turbo compressor may compress refrigerant plural times by using a plurality of impellers and a plurality of diffusers. At this time, as the compression is carried out more times, pressure of the refrigerant increases.

For example, a first-stage impeller may be mounted on one side of a rotary shaft, and a second-stage impeller may be mounted on another side of the rotary shaft.

A pressure difference occurs between refrigerant suctioned into the first-stage impeller and refrigerant suctioned into the second-stage impeller.

Due to this, different axial loads are applied to both ends of the rotary shaft of the compressor. Accordingly, pressure is applied from a second-stage compression part (including impeller and diffuser) having a large axial load to a first-stage compression part having a relatively small axial load.

Therefore, there is a problem in that an axially-biased load acting on the rotary shaft causes damage to a thrust bearing that supports the axial load.

In particular, when liquid refrigerant is suctioned into an impeller, it may cause serious damage to a bearing.

A thrust bearing structure of a turbo compressor is disclosed in Korean Patent Registration No. 10-0253247 (hereinafter, referred to as Patent Document 2).

In Patent Document 2, refrigerant gas, which is discharged to a refrigeration cycle device via a second compression chamber of first and second compression chambers of a hermetic container, in which a drive part is disposed, is partially bypassed toward rear surfaces of first and second impellers, and a drive shaft is axially supported by pushing force of the bypassed (introduced) refrigerant gas.

For example, force that pushes the first impeller due to suction force during a first-stage compression of compression gas is offset by the compression gas introduced into the rear surface of the first impeller, whereas force that pushes the second impeller due to suction force during a second-stage compression of the compression gas is offset by the compression gas introduced into the rear surface of the second impeller. Thus, both the impellers are not biased to any one direction with respect to the axial direction of the drive shaft.

However, in Patent Document 2, a first retention container, a second retention container, a first bypass pipe, and a second bypass pipe should be disposed outside the turbo compressor to bypass a portion of the refrigerant gas discharged from the second compression chamber to the rear surfaces of the first and second impellers. This makes the structure of the compressor complicated and requires a large installation space of the compressor.

DISCLOSURE OF INVENTION

Technical Problem

A first aspect of the disclosure is to provide a turbo compressor capable of minimizing damage to a journal bearing even when an external impact exceeding an elastic deformation range of the journal bearing is applied to the journal bearing.

A second aspect of the disclosure is to provide a turbo compressor that does not need to assemble additional components and achieves a reduction of the number of components and manufacturing costs.

A third aspect of the disclosure is to provide a turbo compressor having a simple structure.

A fourth aspect of the disclosure is to provide a turbo compressor having a structure that is easy to be assembled and disassembled.

A fifth aspect of the disclosure is to provide a turbo compressor having a structure in which a journal bearing and a shaft are easily aligned.

A sixth aspect of the disclosure is to provide a turbo compressor that is capable of minimizing damage to a thrust bearing in a situation where high-pressure refrigerant or liquid refrigerant flows into a diffuser and a large axial load is applied.

A seventh aspect of the disclosure is to provide a turbo compressor that is capable of minimizing an amount of liquid refrigerant flowing into a diffuser.

An eighth aspect of the disclosure is to provide a turbo compressor having a structure that is simple and capable of minimizing an installation space.

A ninth aspect of the disclosure is to provide a turbo compressor having a structure in which a thrust bearing and a shaft are easily aligned.

Solution to Problem

As a result of intensive research, the inventors of the disclosure have found that the first to ninth aspects may be achieved by the following embodiments of the disclosure.

(1) According to one embodiment, a turbo compressor includes: a housing; a rotary shaft rotatably mounted inside the housing; an impeller configured to rotate by being coupled to the rotary shaft; a bearing configured to rotatably support the rotary shaft; and a bearing housing coupled to the housing and configured to support the bearing, wherein the bearing includes: a journal bearing including a gas foil bearing mounted on an inner circumferential surface of the bearing housing, surrounding the rotary shaft, and spaced apart from the rotary shaft with an air gap, the journal bearing supporting a radial load of the rotary shaft; and a journal bearing safety device disposed in the bearing housing, and configured to limit a radial movement distance of the rotary shaft to within an elastic deformation range of the journal bearing. With this configuration, the journal bearing safety device may suppress damage to the journal bearing by limiting a radial movement range of the rotary shaft to within an elastic deformation range of the journal bearing.

(2) In item (1), the gas foil bearing may include: a bump foil including a plurality of curved portions formed convexly toward the rotary shaft, and a connecting portion connecting the plurality of curved portions adjacent to each other; and a cover foil arranged to cover an inside of the bump foil. With this configuration, the gas foil bearing may efficiently perform a role of a journal bearing, that is, support a radial load of the rotary shaft at high speeds, by using a working fluid even without oil, and also implement a high-efficiency compressor without friction.

(3) In item (1), the journal bearing safety device may include a stopper formed to protrude toward the rotary shaft from the inner circumferential surface of the bearing housing. With this configuration, the stopper may integrally protrude from the inner circumferential surface of the bearing housing, so that any additional component for suppressing damage to the journal bearing is not required. This may result in reducing the number of components, the number of assembly processes, and may also greatly contribute to reducing manufacturing costs.

(4) In item (3), the stopper may be formed to extend circumferentially along the inner circumferential surface of the bearing housing. With this configuration, since the stopper surrounds the rotary shaft in a closed loop form with an air gap from the rotary shaft, damage to the journal bearing may be suppressed radially in all directions even when the rotary shaft exhibits abnormal behavior due to external impact.

(5) In item (3), the journal bearing may further include a bump detachment suppression ring disposed on one side of the gas foil bearing and configured to suppress the gas foil bearing from being axially detached, and the gas foil bearing may be arranged between the bump detachment suppression ring and the stopper. This may result in suppressing an axial detachment of the journal bearing by using the bump detachment suppression ring, and also suppressing damage to the journal bearing due to contact with the rotary shaft by using the stopper.

(6) In item (5), the gas foil bearing may include a bump foil having a curved portion formed convexly toward the rotary shaft, the bump foil may have a bump height to a vertex of the curved portion radially inward from the inner circumferential surface of the bearing housing, and a protrusion height of the stopper may be lower than the bump height and higher than a height of the bump detachment suppression ring protruding toward the rotary shaft based on the inner circumferential surface of the bearing housing. With this configuration, the stopper may suppress damage to the rotary shaft due to contact between the rotary shaft and the bump detachment suppression ring when the rotary shaft moves in the radial direction.

(7) In item (3), the stopper may include: a first stopper disposed on one axial side of the journal bearing; and a second stopper disposed on another axial side of the journal bearing. With this configuration, the stopper may suppress damage to the journal bearing as well as axial detachment of the journal bearing.

(8) In item (1), the gas foil bearing may include a bump foil having a curved portion formed convexly toward the rotary shaft, the bump foil may have a bump height to a vertex of the curved portion radially inward from the inner circumferential surface of the bearing housing, and the journal bearing safety device may include a stopper protruding from the inner circumferential surface of the bearing housing toward the rotary shaft, and having a protrusion height lower than the bump height. With this configuration, the stopper may allow for elastic deformation of the journal bearing, but suppress plastic deformation of the journal bearing.

(9) In item (8), the protrusion height of the stopper may preferably be in the range of 40 to 50% of the bump height. With this configuration, the protrusion height of the stopper may be applied in an optimal range to allow for elastic deformation of the journal bearing and simultaneously suppress plastic deformation of the journal bearing.

(10) In item (3), the stopper may have an outer surface on which a wear-resistant coating layer is formed. Through this, the stopper may suppress damage to the rotary shaft even when it comes into contact with the rotary shaft.

(11) In item (1), the journal bearing safety device may include: a ring mounting groove formed concavely in the inner circumferential surface of the bearing housing along a circumferential direction; and a stop ring extending in a circumferential direction to surround the rotary shaft with an air gap from the rotary shaft, and mounted in the ring mounting groove. With this configuration, the stop ring, which is another embodiment of the journal bearing safety device, may suppress plastic deformation of the journal bearing and simultaneously be easily assembled to or disassembled from the inner circumferential surface of the bearing housing.

(12) In item (11), the stop ring may include: a first stop ring disposed on one axial side of the journal bearing; and a second stop ring disposed on another axial side of the journal bearing. With this configuration, the first and second stop rings may be arranged on both axial sides of the journal bearing, respectively, thereby suppressing damage to the journal bearing as well as axial detachment of the journal bearing.

(13) In item (1), the journal bearing safety device may include: a plurality of ball receiving grooves concavely formed in the inner circumferential surface of the bearing housing; and a plurality of ball bearings spaced apart from the rotary shaft in a circumferential direction with an air gap, and mounted in the ball receiving grooves. With this configuration, the ball ring, which is still another embodiment of the journal bearing safety device, may suppress plastic deformation of the journal bearing and simultaneously be easily assembled to or disassembled from the inner circumferential surface of the bearing housing.

(14) In item (1), the journal bearing safety device may include: a plurality of needle receiving grooves concavely formed on an inner circumferential surface of the bearing housing; and a plurality of needle bearings spaced apart from the rotary shaft in a circumferential direction with an air gap, and mounted in the needle receiving grooves. With this configuration, the needle ring, which is still another embodiment of the journal bearing safety device, may suppress plastic deformation of the journal bearing and simultaneously be easily assembled to or disassembled from the inner circumferential surface of the bearing housing.

(15) In item (1), the turbo compressor may further include a thrust runner protruding radially from the rotary shaft, and the bearing may further include a thrust bearing including a gas foil bearing spaced apart from the thrust runner with an air gap, and configured to support an axial load of the rotary shaft. Through this, the thrust bearing may support the axial load of the rotary shaft, so as to stably support the rotary shaft together with the journal bearing during high-speed rotation.

(16) In item (1), the turbo compressor may further include: an impeller casing receiving the impeller therein, and comprising a diffuser extending spirally from one side of the impeller to compress refrigerant suctioned by the impeller; and a bypass passage formed between an inside of the diffuser and an inside of the housing, so that a portion of refrigerant flowing into the diffuser is bypassed to the inside of the housing.

With this configuration, since pressure equilibrium may be achieved between the diffuser and the housing, a difference between pressure of refrigerant suctioned into the first impeller and pressure of refrigerant suctioned into the second impeller may be minimized.

(17) In item (16), the bearing may include a thrust bearing configured to support an axial load of the rotary shaft, and one side of the bypass passage may communicate with the diffuser, while another side of the bypass passage may communicate with the thrust bearing.

With this configuration, damage to the thrust bearing, which is caused by an axial pressure difference between both ends of the rotary shaft, may be suppressed.

(18) In item (16), the bypass passage may be formed through an inside of the bearing housing, and configured such that one side thereof communicates with the diffuser and another side communicates with the inside of the housing.

With this configuration, liquid refrigerant flowing into the diffuser may be minimized.

(19) In item (16), the bearing housing may include: an axial connection portion formed to surround the rotary shaft; a first radial extension portion extending radially from one side of the axial connection portion; and a second radial extension portion extending radially from another side of the axial connection portion, and the bypass passage may be formed through the first radial extension portion.

With this configuration, the structure of the bypass passage may be simplified.

(20) In item (19), the bypass passage may include: a first bypass passage formed through the first radial extension portion in one direction; and a second bypass passage formed through the second radial extension portion in the one direction.

This may facilitate the passage connection between the first bypass passage and the second bypass passage.

(21) In item (20), a diameter of the second bypass passage may be greater than or equal to a diameter of the first bypass passage.

With this configuration, there is a synergistic effect in which a working fluid may be easily transferred from the first bypass passage to the second bypass passage.

(22) In item (16), the turbo compressor may further include an opening and closing valve installed on one side of the bypass passage and configured to open and close the bypass passage.

With this configuration, the bypass passage and the opening and closing valve may be provided inside the bearing housing, thereby reducing the number of components and manufacturing costs.

(23) In item (22), the turbo compressor may further include a valve link having one side coupled with the opening and closing valve, another side spaced apart from the rotary shaft to be contactable with the rotary shaft, the valve link transmitting axial movement power of the rotary shaft to the opening and closing valve when the rotary shaft moves in the axial direction.

With this configuration, the opening and closing valve may be mechanically actuated by axial movement of the rotary shaft and contact with the rotary shaft, so the structure may be simplified and an installation space may be minimized.

(24) In item (23), the turbo compressor may further include: a thrust runner extending radially from the rotary shaft; and a thrust bearing disposed on the bearing housing at a gap from the thrust runner, including a bump foil and a cover foil covering the bump foil, and configured to support an axial load of the rotary shaft, and a gap between the valve link and the thrust runner may be smaller than or equal to the gap between the thrust bearing and the thrust runner.

With this configuration, when the rotary shaft moves in the axial direction, the thrust runner may first be in contact with the valve link before being in contact with the thrust bearing, which may be effective in suppressing damage to the thrust bearing.

(25) In item (16), the turbo compressor may further include: a thrust runner extending radially from the rotary shaft; and an opening and closing valve installed to open and close the bypass passage, and the opening and closing valve may include: a valve body having a passage opening and closing portion formed on one end thereof to open and close the bypass passage; a valve link rotatably connected to another end of the valve body, and brought into contact with the thrust runner when the thrust runner moves axially to transfer axial movement power of the thrust runner to the another end of the valve body; and a hinge pin hinge-coupled between the one end and the another end of the valve body to serve as a central axis for rotation of the valve body.

With this configuration, when a distance between one end of the valve body and the hinge pin is greater than a distance between another end of the valve body and the hinge pin, the rotation of the valve body may increase compared to the axial movement distance of the valve link, so that the responsiveness of the opening and closing valve may be faster.

(26) In item (25), the turbo compressor may further include an elastic member mounted on the hinge pin so that the valve body returns to an original position thereof, and the elastic member may be a torsion spring, one end of which is coupled to the bearing housing and another end of which is coupled to the rotary shaft.

With this configuration, the torsion spring may apply elastic force in a direction that resists against a rotational direction of the hinge pin, thereby facilitating the valve body to return to its original position.

(27) In item (16), the turbo compressor may further include: a thrust runner extending radially from the rotary shaft; an opening and closing valve installed to open and close the bypass passage formed inside the bearing housing; a valve link one side of which is coupled to the opening and closing valve and another side of which is spaced apart from the thrust runner to be selectively contactable; and magnets mounted on an end portion of the valve link and the thrust runner facing the end portion, respectively, and configured to selectively move the valve link, and the opening and closing valve may be open and closed by using magnetic force of the magnets.

With this configuration, the opening and closing valve may be pulled toward the thrust runner by magnetic force, which may facilitate the opening and closing valve to be actuated before the thrust runner comes into contact with the thrust bearing. The magnet may be applied to each of the valve link and the thrust runner, or may be selectively applied to either the valve link or the thrust runner.

(28) In item (16), the turbo compressor may further include an opening and closing valve installed to open and close the bypass passage formed inside the diffuser or the bearing housing, and the opening and closing valve may be implemented as a differential pressure valve actuated by a pressure difference between the diffuser and the inside of the housing.

With this configuration, the differential pressure valve may be actuated by using a pressure difference between the diffuser and the housing without having to come into contact with the thrust runner, which may result in minimizing the number of components and greatly contributing to the simplification of the structure. This may also enhance the degree of freedom in an installation location. For example, there is an advantage in that the opening and closing valve may be installed easily without being restricted by location, such as the diffuser or inside of the housing.

(29) In item (16), the turbo compressor may further include an opening and closing valve installed to open and close the bypass passage formed inside the diffuser or the bearing housing, and the opening and closing valve may be implemented as a bimetal valve actuated according to temperature of refrigerant suctioned into the diffuser.

With this configuration, the bimetal valve may be configured to be actuated according to temperature of refrigerant suctioned into the diffuser, and various valve structures may be configured, as needed, together with the differential pressure valve.

(30) In any one of items (16) to (29), the impeller may include: a first impeller rotatably coupled to one end of the rotary shaft; and a second impeller rotatably coupled to another end of the rotary shaft, the diffuser may include: a first diffuser configured to compress a working fluid suctioned through the first impeller; and a second diffuser configured to recompress the compressed working fluid suctioned from the first diffuser through the second impeller, and one side of the bypass passage may communicate with the first diffuser while another side of the bypass passage may communicate with the inside of the housing.

Through this, it may be possible to actively respond to a phenomenon in which the axial load of the rotary shaft is biased to one side, that is, from the second impeller toward the first impeller, when the rotary shaft exhibits abnormal behavior.

Advantageous Effects of Invention

According to one or more embodiments, the following effects may be obtained.

First, a journal bearing may include a gas foil bearing mounted on an inner circumferential surface of a bearing housing, and support a radial load of a rotary shaft with an air gap from the rotary shaft. A journal bearing safety device may be provided on the inner circumferential surface of the bearing housing. The journal bearing safety device may be configured to limit a radial movement range of the rotary shaft to within an elastic deformation range of the journal bearing. In one embodiment, a stopper may be formed to protrude from the inner circumferential surface of the bearing housing toward the rotary shaft. The stopper may be in contact with the rotary shaft to limit the radial movement of the rotary shaft. Accordingly, the stopper may limit the radial movement distance of the rotary shaft, thereby suppressing plastic deformation of the journal bearing even when the rotary shaft exhibits abnormal behavior due to an abnormal operation, which is caused by external impact or liquid refrigerant, while the journal bearing supports the radial load of the rotary shaft.

Second, the stopper may integrally protrude from the inner circumferential surface of the bearing housing, so that any additional component for suppressing damage to the journal bearing is not required. This may result in reducing the number of components and the number of assembly processes, and greatly contributing to reducing manufacturing costs.

Third, the stopper may form a structure protruding from the inner circumferential surface of the bearing housing, thereby improving durability through structural simplification.

Fourth, a protrusion height of the stopper protruding from the inner circumferential surface of the bearing housing may be lower than a bump height, which is defined from the inner circumferential surface of the bearing housing to a vertex of a curved portion of the gas foil bearing in the radial direction, and may be higher than a height of a bump detachment suppression ring protruding from a ring groove toward the rotary shaft based on the inner circumferential surface of the bearing housing. Accordingly, even when the rotary shaft exhibits abnormal behavior, the radial movement of the rotary shaft may be stopped by the stopper before the rotary shaft comes into contact with the bump detachment suppression ring, thereby suppressing damage to the rotary shaft due to contact between the rotary shaft and the bump detachment suppression ring.

Fifth, as other embodiments of a journal bearing safety device, stop rings, ball bearings, and needle bearings may be applied. Grooves may be formed in the inner circumferential surface of the bearing housing, such that the stop rings, ball bearings, and needle bearings may be coupled. The grooves may be arranged adjacent to the front or rear end of the inner circumferential surface of the bearing housing, and thus the stop rings, ball bearings, and needle bearings may be easily assembled into or disassembled from the grooves.

Sixth, the ball bearings and the needle bearings may be spaced circumferentially apart along the inner circumferential surface of the bearing housing. Accordingly, the ball bearings and the needle bearings may have a smaller area of contact with the rotary shaft than the stop ring extending circumferentially along the inner circumferential surface of the bearing housing. Therefore, even when the rotary shaft exhibits abnormal behavior due to external impact, etc., the ball bearing or the needle bearing may reduce the contact area through a point-contact or line-contact with the rotary shaft, thereby minimizing damages to the journal bearing and the rotary shaft.

Seventh, the stopper, the stop ring, the ball bearing, and the needle bearing may each have a surface on which a wear-resistant coating layer is formed, thereby minimizing damages to the journal bearing and the rotary shaft due to the contact with the rotary shaft.

Eighth, the stopper, the stop ring, the ball bearing, and the needle bearing may limit a radial movement range of the rotary shaft to within an elastic deformation range of the journal bearing, so there may be an advantage of facilitating alignment between the journal bearing and the rotary shaft.

Ninth, a bypass passage may be formed such that a diffuser of an impeller casing and the inside of a housing communicate with each other. The bypass passage may bypass some of high-pressure refrigerant or liquid refrigerant, which flows into a compression part (the diffuser), to be introduced into the housing.

This may achieve pressure equilibrium between the diffuser and the housing, thereby minimizing a difference between axial pressure on a first impeller side and axial pressure on a second impeller side.

Tenth, some of the bypassed refrigerant may form an oil film between a thrust bearing and a thrust runner. Through this, the bypassed refrigerant may lubricate the thrust bearing, thereby suppressing damage to the thrust bearing, which is caused by an axial load applied to the rotary shaft.

Eleventh, when liquid refrigerant is introduced into the diffuser, the bypass passage may bypass some of liquid refrigerant to be introduced into the housing, thereby minimizing the introduction of the liquid refrigerant into the compression part (the diffuser).

Twelfth, the bypass passage and an opening and closing valve for opening and closing the same may be installed inside the diffuser or bearing housing, which may reduce the number of components, contribute to miniaturization, and reduce manufacturing costs.

Thirteenth, since the opening and closing valve is actuated through a mechanical mechanism by contact with the thrust runner along with an axial movement of the rotary shaft, a structure may be simplified and an installation space may be minimized.

Fourteenth, assembly and disassembly may be facilitated by employing a structure in which only the opening and closing valve and a valve link are additionally mounted and assembled inside the bearing housing.

Fifteenth, the bypassed refrigerant may move in an opposite direction to a shaft-moving direction of the rotary shaft, thereby offsetting axial force. This may provide the advantage of allowing easy alignment between the thrust bearing and the rotary shaft without the need for additional components.

MODE FOR THE INVENTION

Hereinafter, a turbo compressor according to an embodiment of the disclosure will be described in detail with reference to the accompanying drawings.

In the following description, a description of some components will be omitted to clarify features of the present disclosure.

1. Definition of Terms

It will be understood that when an element is referred to as being "connected with" another element, the element may be connected with the another element or intervening elements may also be present.

In contrast, when an element is referred to as being "directly connected with" another element, there are no intervening elements present.

A singular representation as used herein may include a plural representation unless it represents a definitely different meaning from the context.

The term "axial direction" as used herein means an axial direction of a rotary shaft.

The term "radial direction" as used herein means a radial direction of the rotary shaft.

2. Description of Configuration of Turbo Compressor According to One Embodiment

Hereinafter, a turbo compressor according to an embodiment will be described in detail with reference to the accompanying drawings.

Figure 1:
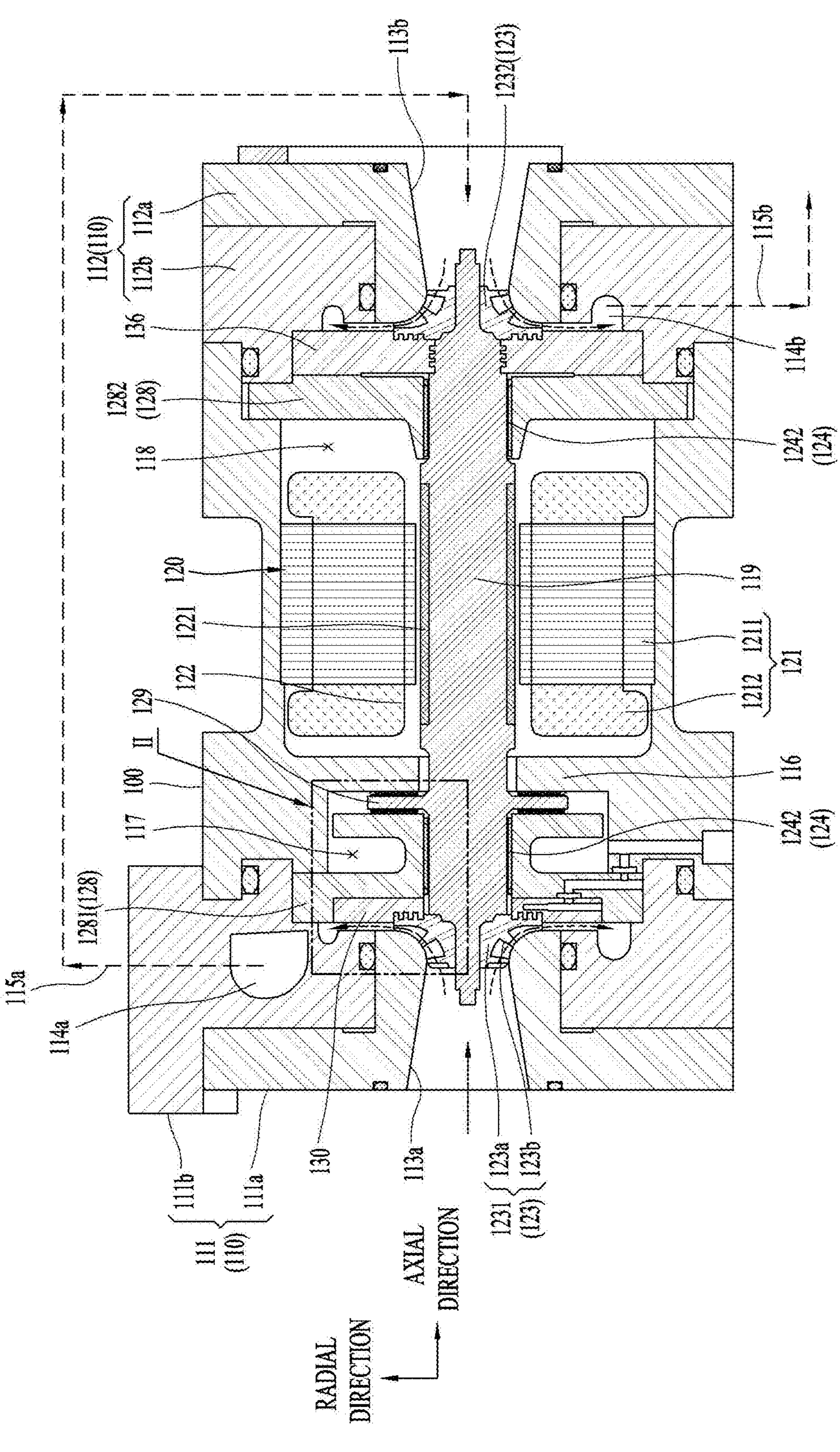
FIG. 1 is a schematic view of one example illustrating a turbo compressor according to the disclosure.

FIG. 1 is a schematic view of one example illustrating a turbo compressor according to the disclosure.

Figure 2:
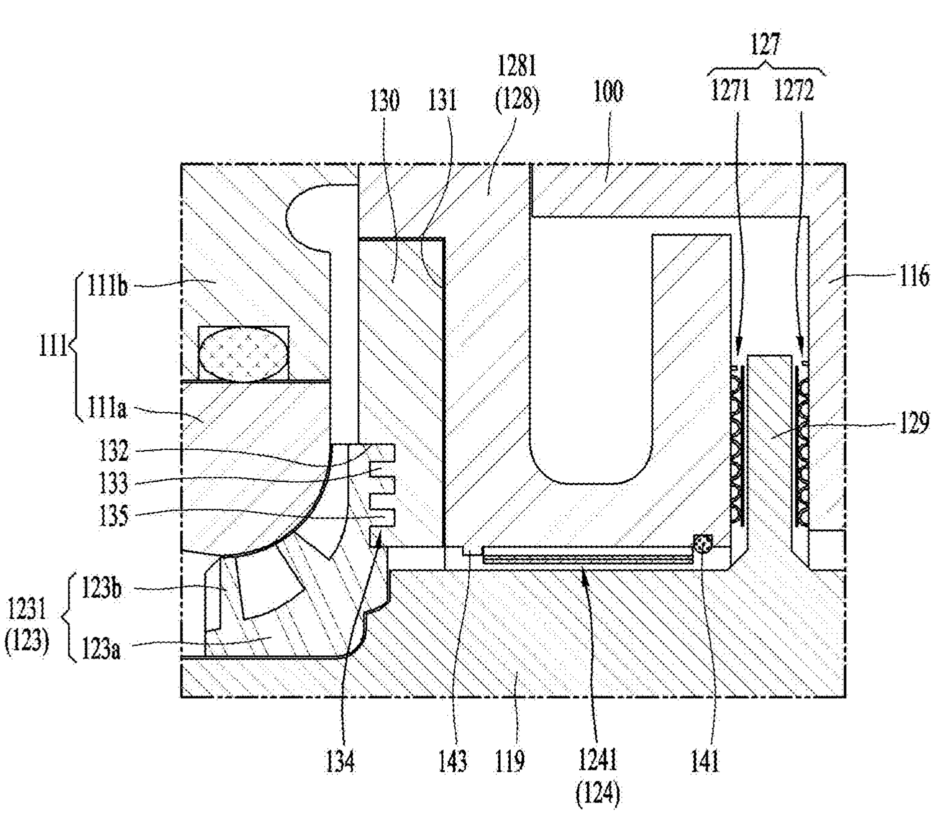
FIG. 2 is a partial enlarged view of a part II in FIG. 1.

FIG. 2 is a partial enlarged view of a part II in FIG. 1.

Figure 3:
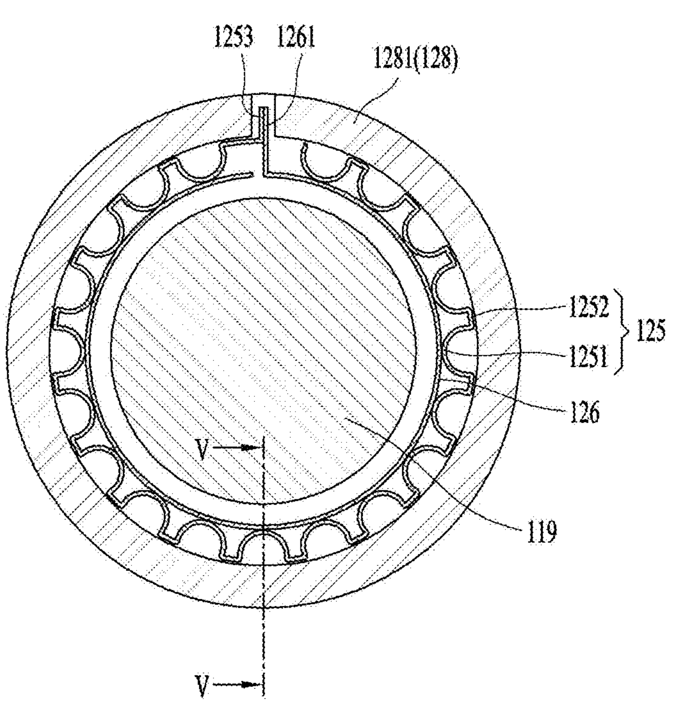
FIG. 3 is a conceptual view of a journal bearing in FIG. 2 viewed in an axial direction.

FIG. 3 is a conceptual view of a journal bearing 124 in FIG. 2 viewed in an axial direction.

Figure 4:
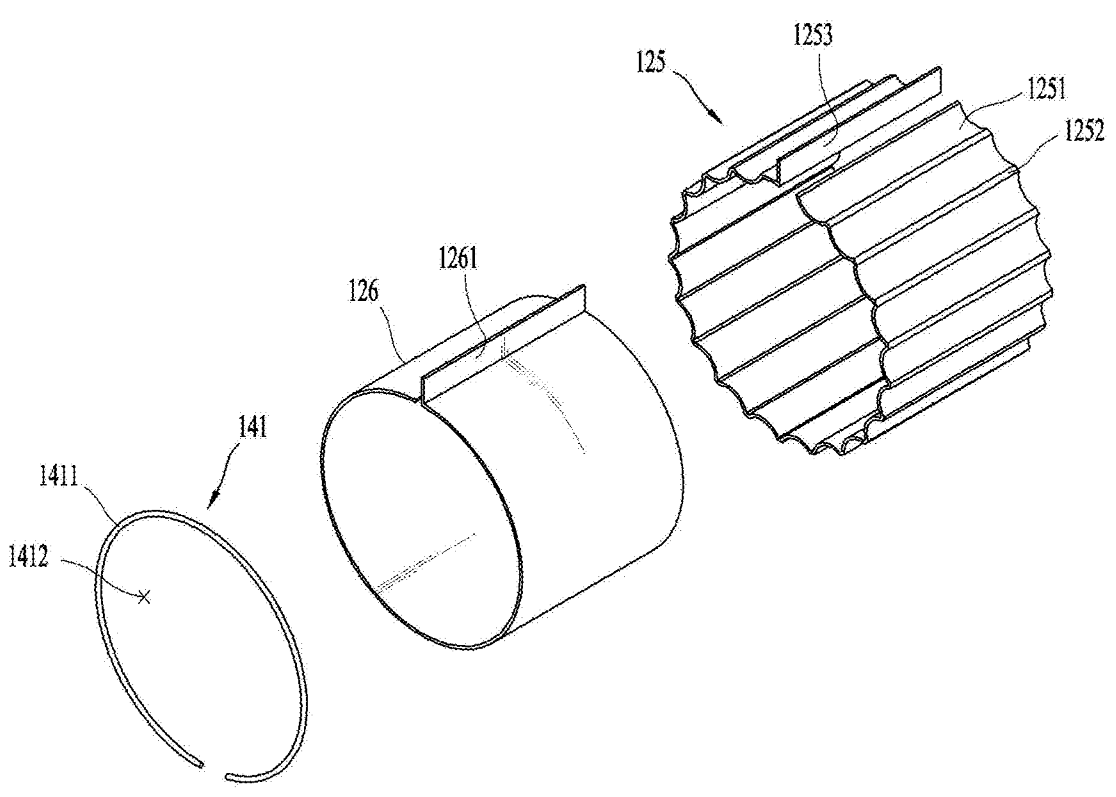
FIG. 4 is an exploded perspective view of the journal bearing in FIG. 3.

FIG. 4 is an exploded perspective view of the journal bearing 124 in FIG. 3.

A turbo compressor according to the disclosure may include a housing 100, a motor part 120, a rotary shaft 119, an impeller 123, an impeller casing 110, a bearing housing 128, a thrust bearing 127, and a journal bearing 124.

(1) Components of Compressor

The housing 100 may be formed in a cylindrical shape. The housing 100 may define the appearance of the turbo compressor.

Both sides of the housing 100 may be fastened to the impeller casing 110.

An accommodation space may be defined inside the housing 100. The accommodation space of the housing 100 may be divided into a first space 117 and a second space 118. The first space 117 and the second space 118 may be partitioned by a barrier wall 116.

The barrier wall 116 may protrude radially from an inner circumferential surface of the housing 100 toward the rotary shaft 119. The barrier wall 116 may extend along the inner circumferential surface of the housing 100 in a circumferential direction. The barrier wall 116 may be formed in a circular plate shape having a preset thickness.

A shaft penetration hole may be formed through a central portion of the barrier wall 116 such that the rotary shaft 119 passes through it.

The barrier wall 116 may be positioned radially apart from the rotary shaft 119 at a preset interval.

The barrier wall 116 may be disposed to be biased from a longitudinal center of the housing 100 in one direction.

The first space 117 may be formed to be open toward one side of the housing 100, and the second space 118 may be formed to be open toward another side of the housing 100.

The first space 117 and the second space 118 may have different volumes from each other. The volume of the first space 117 may be smaller than the volume of the second space 118.

The motor part 120 to be explained later may be received in the second space 118 that has a relatively large volume. A portion of a first bearing housing 1281, which will be described later, may be received in the first space 117. A second bearing housing 1282, which will be described later, may be received in the second space 118.

The rotary shaft 119 may be horizontally disposed in the first space 117 and the second space 118, to axially pass through a radial center portion of the housing 100.

The motor part 120 may include a stator 121 and a rotor 122. The stator 121 may include a stator core 1211 and a stator coil 1212. The stator core 1211 may be formed in a cylindrical shape by stacking a plurality of electrical steel sheets.

The stator core 1211 may be provided with a plurality of teeth formed therein to protrude toward the rotary shaft 119 in the radial direction. A plurality of slots may be formed between the plurality of teeth. The plurality of teeth and the plurality of slots may be arranged alternately in the circumferential direction of the stator core 1211 and may be spaced apart from each other in the circumferential direction.

The stator coil 1212 may be wound on the stator core 1211 through the slots 102.

When power is applied to the stator coil 1212, a magnetic field may be generated around the stator coil 1212.

The rotor 122 may be arranged inside the stator 121. The rotor 122 may be positioned apart from the stator 121 with an air gap therebetween. The rotor 122 may be mounted on the rotary shaft 119 to be rotatable relative to the stator 121.

The rotor 122 may include a rotor core and permanent magnets 1221. The rotor core may be mounted to be rotatable together with the rotary shaft 119 or may be omitted. When the rotor core is omitted, the permanent magnets 1221 may be mounted on the rotary shaft 119.

The permanent magnets 1221 may be arranged on the rotary shaft 119 or the rotor core to radially overlap an inner surface of the stator 121 with an air gap. In the embodiment disclosed herein, the permanent magnets 1221 are shown mounted on the rotary shaft 119.

A rotor support portion may be disposed on the rotary shaft 119. The rotor support portion may be positioned on an axial center of the rotary shaft 119. The rotor support portion may be formed to be recessed into or protrude from the rotary shaft 119 in the radial direction.

The corresponding permanent magnet 1221 may be mounted to be received in the rotor support portion, or may be fixed between the plurality of rotor support portions so that its axial movement is limited by the protruded rotor support portions. In the embodiment disclosed herein, it is illustrated that the rotor support portions protrude radially from the rotary shaft 119, and the corresponding permanent magnet 1221 is fixedly positioned between the plurality of rotor support portions.

The permanent magnet 1221 may be formed in a ring shape. The permanent magnet 1221 may have an inner diameter that is equal to a diameter of the rotary shaft 119. The permanent magnet 1221 may have an outer diameter that is smaller than an inner diameter of the stator core.

With the configuration, when power is applied to the stator 121, the rotor 122 may rotate relative to the stator 121 by electromagnetic interaction between the stator 121 and the rotor 122.

The rotary shaft 119 may transmit rotational force to an impeller 123 to be described later while rotating together with the rotor 122.

The rotary shaft 119 may be supported at both ends by bearings. The bearings may include a first bearing and a second bearing.

The first bearing may be configured to support one side of the rotary shaft 119. The first bearing may be disposed between the motor part 120 and a first-stage impeller 123 to be described later.

The second bearing may be configured to support another side of the rotary shaft 119. The second bearing may be disposed between the motor part 120 and a second-stage impeller 123 to be described later.

The bearings may include a journal bearing 124 that supports a radial load of the rotary shaft 119 and a thrust bearing 127 that supports an axial load of the rotary shaft 119.

The first bearing may include a first journal bearing 1241, a first thrust bearing 1271, and a second thrust bearing 1272.

The second bearing may include a second journal bearing 1242.

The bearing housing 128 may include a first bearing housing 1281 and a second bearing housing 1282.

The first bearing housing 1281 may be configured to support the first bearing. However, the second thrust bearing 1272 may be supported on the barrier wall 116.

The first bearing housing 1281 may be formed in a cylindrical shape. The first bearing housing 1281 may have a circular pocket formed radially inward.

The first bearing housing 1281 may be positioned between a first impeller casing 111 to be described later and the barrier wall 116 of the housing 100. A portion of the first bearing housing 1281 may be accommodated in the first space 117 of the housing 100, and another portion of the first bearing housing 1281 may be accommodated inside the first impeller casing 111.

The first bearing housing 1281 may be press-fitted to the inside of the first impeller casing 111 and the housing 100.

A first shaft hole may be formed inside the first bearing housing 1281 so that the rotary shaft 119 passes through it. The first shaft hole may have a diameter greater than the rotary shaft 119.

The first bearing may be mounted on the first bearing housing 1281.

The first journal bearing 1241 may be mounted to be received radially inside the first bearing housing 1281.

The first thrust bearing 1271 may be mounted on an axial rear surface of the first bearing housing 1281.

A thrust runner 129 may be disposed on the rotary shaft 119. The thrust runner 129 may protrude radially from the rotary shaft 119 to the first space 117. The thrust runner 129 may rotate together with the rotary shaft 119.

The first thrust bearing 1271 may be arranged axially spaced apart from one axial side surface of the thrust runner 129.

The second thrust bearing 1272 may be mounted on the barrier wall 116. The second thrust bearing 1272 may be arranged spaced apart from an opposite side of the first thrust bearing 1271 with the thrust runner 129 therebetween.

The second thrust bearing 1252 may be arranged axially spaced apart from another axial side surface of the thrust runner 129.

The second bearing housing 1282 may be configured to include a bearing receiving portion and a radial extension portion.

A second shaft hole formed in a cylindrical shape is provided inside the bearing receiving portion. The rotary shaft 119 may pass axially through the second shaft hole. An outer circumferential surface of the bearing receiving portion may be inclined with respect to the axial direction.

The second journal bearing 1242 may be mounted on an inner surface of the bearing receiving portion. The second journal bearing 1242 may be arranged radially spaced apart from the rotary shaft 119 with a gap therebetween.

The radial extension portion may extend from an outer circumferential portion of the bearing receiving portion to protrude radially outward. The radial extension portion may extend in a circular plate shape along the circumferential direction.

The radial extension portion may be coupled to the inside of another end of the housing 100.

The bearing receiving portion may protrude axially from the radial extension portion toward the second space 118 of the housing 100.

According to this configuration, the first journal bearing 1241 and the second journal bearing 1242 may support the radial load of the rotary shaft 119.

The first thrust bearing 1271 and the second thrust bearing 1272 may support the axial load of the rotary shaft 119 with the thrust runner 129 therebetween.

The journal bearing 124 and the thrust bearing 127 according to the embodiment may each be implemented as a gas foil bearing.

The gas foil bearing is configured to support the rotary shaft 119 by means of a working fluid.

The working fluid may be refrigerant, air, etc. The gas foil bearing may be arranged spaced apart from the rotary shaft 119 with a preset gap (air gap).

A gas foil bearing may rotatably support the rotary shaft 119 by using a working fluid filled in the gap between the rotary shaft 119 and the bearing.

The bearing according to the disclosure may be spaced apart from the rotary shaft 119, to thus rotatably support the rotary shaft 119 in a non-contact manner. Accordingly, as the rotary shaft 119 rotates at high speed, an air gap may be stably formed between the rotary shaft 119 and the bearing, and the center of the rotary shaft 119 may be positioned at the center of the bearing. When the rotation speed increases, pressure of the air gap may increase by centrifugal force, thereby improving a shaft support capacity and implementing a high-efficiency compressor without friction. Noise and wear may also be reduced, thereby extending the lifespan of the bearing. The bearing according to the disclosure does not require lubricant, so there is no need for lubricant replacement and maintenance costs.

The gas foil bearing may be made of an elastic material. The gas foil bearing includes a bump foil 125 and a cover foil 126.

The bump foil 125 may be formed in an embossed shape and have elasticity. The cover foil 126 may be disposed to cover the bump foil 125.

The bump foil 125 may include a curved portion 1251 and a connecting portion 1252. The curved portion 1251 may be formed in a semicircular shape. The curved portion 1251 and the connecting portion 1252 may each be provided in plurality.

When the journal bearing 124 is implemented as a gas foil bearing, the bump foil 125 may have a structure in which a thin steel plate is rolled into a cylindrical shape.

The plurality of curved portions 1251 and connecting portions 1252 may be arranged alternately along the circumferential direction.

The curved portion 1251 may be arranged to face an outer circumferential surface of the rotary shaft 119. The curved portion 1251 may be formed to be convex toward the rotary shaft 119.

The connecting portion 1252 may be configured to connect the curved portions 1251 that are adjacent to each other in the circumferential direction.

The connecting portion 1252 may be arranged to be contactable with the inner circumferential surface of the bearing housing 128. The connecting portion 1252 may circumferentially extend along the inner circumferential surface of the bearing housing 128.

The bump foil 125 may include a bump fixing portion 1253. The bump fixing portion 1253 is provided on one end of the bump foil 125. Another end of the bump foil 125, which is cylindrically rolled, may be arranged adjacent to the bump fixing portion 1253.

The bump fixing portion 1253 may be formed to be bent radially outward from the connecting portion 1252.

A fixing groove 1283 for fixing the bump foil 125 may be formed in the inner circumferential surface of the bearing housing 128. The bump fixing portion 1253 may be inserted into the fixing groove 1283.

The cover foil 126 may include a cover fixing portion 1261. The cover foil 126 may have a structure in which a thin steel plate is rolled into a cylindrical shape so that both ends are placed adjacent to each other. The cover fixing portion 1261 may be disposed on another end of the cover foil 126 that is rolled into the cylindrical shape.

The cover fixing portion 1261 may be arranged to face the bump fixing portion 1253. The cover fixing portion 1261 may be inserted into the fixing groove 1283 to fix the cover foil 126 to the bearing housing 128.

The bump foil 125 may be arranged to surround the cover foil 126. The cover foil 126 may extend in the circumferential direction to be in contact with a vertex of the curved portion 1251 formed in the semicircular shape that is convex toward the rotary shaft 119.

The rotary shaft 119 may move radially to be in contact with the cover foil 126. The cover foil 126 may transmit force received from the rotary shaft 119 to the bump foil 125. The bump foil 125 may be deformed within an elastic range by the force transmitted through the cover foil 126.

When the bump fixing portion 1253 and the cover fixing portion 1261 are fixed inside the fixing groove 1283, an extra space may be formed between the cover fixing portion 1261 and another end of the bump foil 125, so that the bump foil 125 and the cover foil 126 may be elastically deformed. An extra space may also be formed between the cover fixing portion 1261 and one end of the cover foil 126.

The turbo compressor may compress refrigerant in multiple stages depending on the number of impellers 123. In the embodiment disclosed herein, the turbo compressor is implemented as a two-stage compressor.

The impeller 123 may be classified into a first impeller 1231 to an Nth impeller according to a compression order of refrigerant. In the embodiment disclosed herein, the impeller 123 is shown as including a first impeller 1231 and a second impeller 1232. The first impeller 1231 may be named a first-stage impeller 123, and the second impeller 1232 may be named a second-stage impeller 123.

Unless the first impeller 1231 and the second impeller 1232 are separately distinguished in the specification, a description of the configuration of the impeller 123 may also be applied to the first impeller 1231 and the second impeller 1232.

A fluid such as refrigerant and/or air may be subjected to a first-stage compression in the first impeller 1231 and a second-stage compression in the second impeller 1232.

The impeller 123 may be mounted on the rotary shaft 119 to be rotatable together with the rotary shaft 119. The impeller 123 may rotate by receiving force from the motor part 120 through the rotary shaft 119.

The impeller 123 may suction a fluid such as refrigerant and compress the fluid such as the refrigerant while rotating together with the rotary shaft 119.

A first impeller support portion and a second impeller support portion may be disposed on both ends of the rotary shaft 119.

The first impeller support portion may have a diameter smaller than the diameter of the rotary shaft 119 and may protrude axially from one end of the rotary shaft 119. The first impeller support portion may be press-fitted to the inside of a hub **123*a* of the first impeller 1231**.

The second impeller support portion may have a diameter smaller than the diameter of the rotary shaft 119 and may protrude axially from another end of the rotary shaft 119. The second impeller support portion may be press-fitted to the inside of a hub **123*a* of the second impeller 1232**.

The impeller 123 may include a hub **123*a* and a plurality of blades 123*b***.

The hub **123*a* may include a through hole formed through an inside thereof and the rotary shaft 119 may pass through the through hole. The hub 123*a* may be formed in a conical shape. An outer circumferential surface of the hub 123*a* may be formed to be inclined with respect to the axial direction. A diameter of the hub 123*a* may be formed to increase from one axial side of the hub 123*a* to another axial side of the hub 123*a***.

The plurality of blades **123*b* may protrude spirally from the outer circumferential surface of the hub 123*a*. The plurality of blades 123*b* may be arranged spaced apart from each other in the circumferential direction of the hub 123*a***.

According to this configuration, the impeller 123 may suction gas such as refrigerant in the axial direction and discharge the suctioned gas in a centrifugal direction of the impeller 123.

A first impeller casing 111 may be fastened to one side of the housing 100. An axial rear surface of the first impeller casing 111 may be covered with the first bearing housing 1281 received in one side of the housing 100.

A second impeller casing 112 may be fastened to another side of the housing 100. An axial rear surface of the second impeller casing 112 may be covered with the second bearing housing 1282 received in another side of the housing 100. The axial rear surfaces of the first impeller casing 111 and the second impeller casing 112 refer to the downstream side of the impeller casing 110 based on a flow direction of refrigerant.

The first impeller casing 111 may include a suction port **113*a*, 113*b*, a diffuser 114*a*, 114*b*, and a discharge port 115*a*, 115*b***.

The suction port **113*a*, 113*b* may be formed through a center of the first impeller casing 111 in the axial direction. One side of the suction port 113*a*, 113*b* may communicate with the outside of the first impeller casing 111, and another side of the suction port 113*a*, 113*b* may communicate with the inside of the first impeller casing 111**.

The first impeller 1231 may be received inside the suction port **113*a*, 113*b*. The first impeller 1231 may be mounted on the first impeller support portion and may rotate together with the rotary shaft 119**.

The suction port 113*a*, 113*b* may be formed so that its diameter decreases from one axial side to another axial side. Accordingly, a flow rate of refrigerant that is suctioned through the suction port 113*a*, 113*b* may increase.

The diffuser 114*a*, 114*b* may be formed to be axially recessed into the axial rear surface of the first impeller casing 111. The diffuser 114*a*, 114*b* may be formed inside the first impeller casing 111. The diffuser 114*a*, 114*b* may be arranged between the suction port 113*a*, 113*b* and the discharge port 115*a*, 115*b*.

The diffuser 114*a*, 114*b* may be formed to extend in a spiral direction from the suction port 113*a*, 113*b*. The diffuser 114*a*, 114*b* may be connected to communicate with the suction port 113*a*, 113*b* and the discharge port 115*a*, 115*b*. The diffuser 114*a*, 114*b* may be formed so that a size of a passage (flow path) increases from the suction port 113*a*, 113*b* to the discharge port 115*a*, 115*b*.

According to this configuration, as the size of the passage in the diffuser 114*a*, 114*b* increases, pressure of a working fluid that is suctioned by the rotation of the impeller 123 may increase while passing through the diffuser 114*a*, 114*b*.

That is, the diffuser 114*a*, 114*b* may increase pressure of refrigerant by converting kinetic energy of the refrigerant suctioned through the suction port 113*a*, 113*b* into pressure energy.

The discharge port 115*a*, 115*b* may be disposed on an outer circumferential portion of the first impeller casing 111. The discharge port 115*a*, 115*b* may extend radially from the diffuser 114*a*, 114*b*. A discharge pipe may be formed to protrude outward from the outer circumferential portion of the first impeller casing 111.

The discharge pipe may be connected such that one side thereof communicates with the discharge port 115*a*, 115*b* and another side communicates with the outside of the first impeller casing 111.

The second impeller casing 112 may include a suction port 113*a*, 113*b*, a diffuser 114*a*, 114*b*, and a discharge port 115*a*, 115*b*. The suction port 113*a*, 113*b*, the diffuser 114*a*, 114*b*, and the discharge port 115*a*, 115*b* of the second impeller casing 112 are equal or similar to the suction port 113*a*, 113*b*, the diffuser 114*a*, 114*b*, and the discharge port 115*a*, 115*b* of the first impeller 1231, so a redundant description will be omitted.

However, for a second-stage compression, the discharge pipe of the first impeller casing 111 may be connected to the suction port 113*a*, 113*b* of the second impeller casing 112 through a connection pipe (not illustrated).

Each of the first impeller casing 111 and the second impeller casing 112 may be configured to be separated into two parts.

One part may be a suction part 111*a*, 112*a*. The suction part 111*a*, 112*a* may be formed to have a T-like cross-sectional shape. The suction part 111*a*, 112*a* may be configured with a radial portion extending in the radial direction and an axial portion extending in the axial direction. The suction port 113*a*, 113*b* may be formed inside the axial portion of the suction part 111*a*, 112*a*.

A downstream portion of the suction part 111*a*, 112*a* may be formed to be curved in an arcuate shape. The downstream portion of the suction part 111*a*, 112*a* may be configured to receive the impeller 123.

Another part may be a diffuser part 111*b*, 112*b*. The diffuser part 111*b*, 112*b* may be formed to surround an outer circumference and a rear surface of the radial portion of the suction part 111*a*, 112*a* and an outer circumferential surface of the axial portion. The suction part 111*a*, 112*a* and the diffuser part 111*b*, 112*b* may be coupled to each other.

The rear surface of the radial portion of the suction part 111*a*, 112*a* refers to a downstream surface based on a suction direction of refrigerant.

To suppress refrigerant leakage, a radial sealing member and an axial sealing member may be provided.

The radial sealing member may be disposed between the bearing housing 128 and the impeller 123. In the embodiment disclosed herein, the radial sealing member is shown arranged between the first bearing housing 1281 and the impeller 123.

The radial sealing member may be configured with a first radial sealing portion 130 and a second radial sealing portion 134.

For example, the first radial sealing portion 130 may be arranged on one axial side surface of the first bearing housing 1281.

The first radial sealing portion 130 may be formed integrally on one axial side surface of the first bearing housing 1281 or may be coupled to the one axial side surface of the first bearing housing 1281.

In the embodiment disclosed herein, the first radial sealing portion 130 is shown coupled to one axial side surface of the first bearing housing 1281. To this end, a sealing portion receiving groove 131, in which the first radial sealing portion 130 is received, may be formed to be axially recessed into the one axial side surface of the first bearing housing 1281.

The first radial sealing portion 130 may include a plurality of sealing grooves 132 and a plurality of first land portions 133.

The plurality of sealing grooves 132 may be formed to be axially recessed into one axial side surface (front surface) of the first radial sealing portion 130 in an opposite direction to the impeller 123. The plurality of sealing grooves 132 may extend along the circumferential direction of the first radial sealing portion 130.

The front surface of the first radial sealing portion 130 may refer to a surface facing the impeller 123.

The plurality of sealing grooves 132 may be arranged in a spaced manner in the radial direction of the first radial sealing portion 130.

The plurality of sealing grooves 132 may be arranged to overlap the impeller 123 in the axial direction.

The plurality of first land portions 133 may be arranged between the plurality of sealing grooves 132.

The plurality of sealing grooves 132 and the plurality of first land portions 133 may be alternately arranged in the radial direction of the first radial sealing portion 130.

Each of the plurality of sealing grooves 132 and the plurality of first land portions 133 may be formed in an annular shape. However, a radial width of the sealing groove 132 and a radial thickness of the first land portion 133 may be formed differently.

A second radial sealing portion 134 may be disposed on another axial side surface (rear surface) of the first impeller 1231. The rear surface of the first impeller 1231 may be a surface facing the first radial sealing portion 130.

The second radial sealing portion 134 may be arranged at a downstream side of the first impeller 1231 based on a flow direction of refrigerant. The second radial sealing portion 134 may rotate together with the first impeller 1231.

The second radial sealing portion 134 may include a plurality of sealing protrusions 135.

The plurality of sealing protrusions 135 may be formed to protrude axially from another axial side surface of the hub 123*a* of the first impeller 1231 toward the first radial sealing portion 130. The plurality of sealing protrusions 135 may be received in the plurality of sealing grooves 132, respectively.

The sealing protrusion 135 may be received in the sealing groove 132, but may be arranged to be spaced apart from an inner surface of the sealing groove 132 with preset intervals in the axial direction and the radial direction.

The sealing protrusion 135 may extend along the circumferential direction of the hub 123*a* and may be formed in an annular shape.

The plurality of sealing protrusions 135 and the plurality of first land portions 133 may be arranged to overlap each other in the radial direction.

According to this configuration, as the plurality of sealing protrusions 135 and the plurality of first land portions 133 are arranged to overlap each other in the radial direction, leakage of refrigerant discharged from the impeller 123 to the diffuser 114*a*, 114*b* may be suppressed.

For example, when the impeller 123 rotates, the plurality of blades 123*b* may rotate around the hub 123*a*, so that the impeller 123 may discharge refrigerant suctioned through a space between the plurality of blades 123*b* toward the diffuser 114*a*, 114*b* in the radial direction.

Here, the plurality of sealing protrusions 135 and first land portions 133 may act as flow resistance for the refrigerant, which flows from the diffuser 114*a*, 114*b* toward the downstream side of the impeller 123, thereby suppressing the refrigerant from flowing backward to a radial inside through a gap between the sealing groove 132 of the first radial sealing portion 130 and the rear surface of the impeller 123.

The radial sealing member may also be equally applied between the second bearing housing 1282 and the second impeller 1232.

The axial sealing member may be disposed between the second bearing housing 1282 and the second impeller casing 112. The axial sealing member may be configured with a first axial sealing portion 136 and a second axial sealing portion.

The first axial sealing portion 136 may be disposed inside the diffuser part 111*b*, 112*b* of the second impeller casing 112. The first axial sealing portion 136 may be coupled between the second bearing housing 1282 and the diffuser part 111*b*, 112*b* of the second impeller casing 112.

The first axial sealing portion 136 may include a plurality of sealing grooves. The plurality of sealing grooves may be formed to be radially recessed into an inner surface of the first axial sealing portion 136, more specifically, into an inner surface of the bearing receiving portion.

The sealing groove may be formed in an annular shape. The sealing groove may extend circumferentially along an inner circumference of the first axial sealing portion 136.

The plurality of sealing grooves may be disposed to be axially spaced apart from one another inside the first axial sealing portion 136. A plurality of second land portions may be positioned between the plurality of sealing grooves. The plurality of sealing grooves and the plurality of second land portions may be arranged alternately to be spaced apart from each other along the axial direction in the inner surface of the first axial sealing portion 136.

The second axial sealing portion may be disposed on another side of the rotary shaft 119. The second axial sealing portion may rotate together with the first impeller 1231. The second axial sealing portion may be arranged to overlap the sealing groove in the radial direction to be received in the sealing groove.

The second axial sealing portion may include a plurality of sealing protrusions.

The plurality of sealing protrusions may be formed to protrude radially outward from an outer circumferential surface of the rotary shaft 119 toward the inner surfaces of the sealing grooves. The plurality of sealing protrusions may be formed in an annular shape.

The plurality of sealing protrusions may be arranged axially spaced apart from one another on the rotary shaft 119.

The plurality of sealing protrusions and the plurality of second land portions may be alternately arranged along the axial direction of the rotary shaft 119. The plurality of sealing protrusions and the plurality of second land portions may be arranged to be spaced apart from each other at a preset interval.

The plurality of second land portions are positioned radially apart from the rotary shaft 119 at a preset interval.

The plurality of sealing protrusions are positioned radially spaced apart from the inner surface of the first axial sealing portion 136 at a preset interval.

The plurality of sealing protrusions and the plurality of second land portions may be arranged to overlap each other in the axial direction.

According to this configuration, as the plurality of sealing protrusions and the plurality of second land portions are arranged to overlap each other in the axial direction, leakage of fluid such as refrigerant suctioned by the second impeller 1232 may be suppressed.

For example, when the second impeller 1232 rotates, the plurality of blades 123*b* may rotate around the hub 123*a*, so that the second impeller 1232 may axially suction refrigerant through a space between the plurality of blades 123*b*.

Here, the plurality of sealing protrusions and the plurality of second land portions may act as flow resistance of refrigerant, which flows through the gap between the first axial sealing portion 136 and the rotary shaft 119, thereby suppressing leakage of the refrigerant through the gap between the inner surface of the first axial sealing portion 136 and the rotary shaft 119.

The axial sealing member may also be applied equally between the first bearing housing 1281 and one side of the rotary shaft 119.

(2) Journal Bearing Safety Device 1

Figure 5:
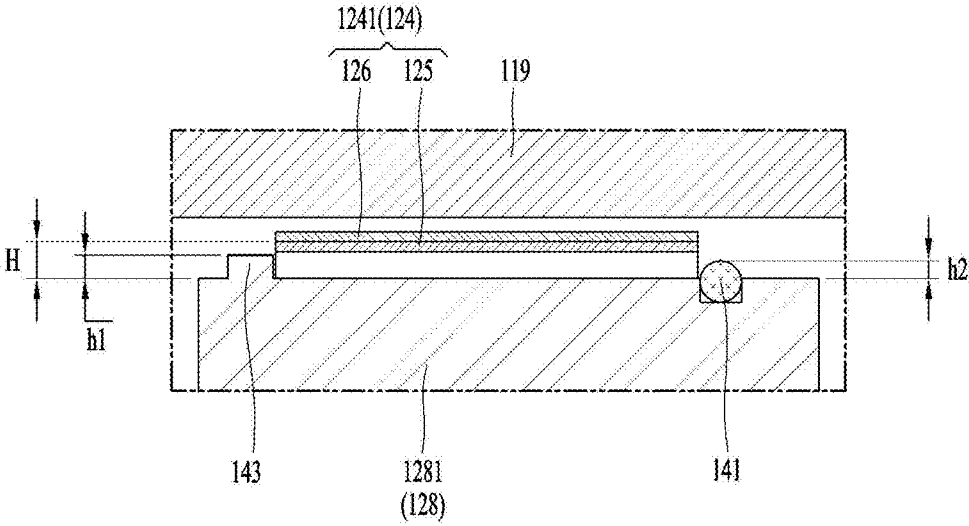
FIG. 5 is a cross-sectional view taken along the line V-V in FIG. 4, which is also a conceptual view for explaining a journal bearing safety device 1 according to one embodiment.

FIG. 5 is a cross-sectional view taken along the line V-V in FIG. 4, which is also a conceptual view for explaining a journal bearing safety device 1 according to one embodiment.

The disclosure may cope with an abnormal behavior due to an abnormal operation caused by external impact, liquid refrigerant, etc.

The bump foil 125 of the journal bearing 124 may support a radial load by spring characteristics, but when subjected to an impact exceeding a certain level, the bump foil 125 undergoes plastic deformation.

The turbo compressor according to the disclosure may include a journal bearing safety device having a structure that is capable of minimizing plastic deformation of the journal bearing 124 and suppressing damage to the rotary shaft 119.

In an embodiment disclosed herein, the journal bearing 124 is shown implemented as a gas foil bearing.

The journal bearing 124 may include a bump foil 125, a cover foil 126, a bump detachment suppression ring 141, and a stopper 143.

The configuration of the bump foil 125 and the cover foil 126 will be understood by the foregoing description.

The bump detachment suppression ring 141 may be formed in a shape of a ring with one side open. The bump detachment suppression ring 141 may include a ring body 1411 and an inner hole 1412. The ring body 1411 may define the exterior of the bump detachment suppression ring 141.

The ring body 1411 may be formed in a circular ring shape. One side of the ring body 1411 may be open in the radial direction. The ring body 1411 may have a circular cross-sectional shape.

The circular inner hole 1412 may be formed inside the ring body 1411. A diameter of the inner hole 1412 may be larger than a diameter of the rotary shaft 119.

The bump detachment suppression ring 141 may be formed in a C-like shape and may thusly be named a C-ring.

The bump detachment suppression ring 141 may be mounted on the first bearing housing 1281. The bump detachment suppression ring 141 may be configured to suppress the bump foil 125 and the cover foil 126 from being detached in the axial direction.

The bump detachment suppression ring 141 may be arranged on one side of the bump foil 125. The bump detachment suppression ring 141 may be disposed to protrude radially inward based on the inner circumferential surface of the first bearing housing 1281 on which the bump foil 125 is mounted.

A ring groove 142 may be formed in one side of the first bearing housing 1281 to be concave in the radial direction. The ring groove 142 may be formed continuously in the circumferential direction along the inner circumferential surface of the first bearing housing 1281.

The bump detachment suppression ring 141 may be coupled by being inserted into the ring groove 142. A portion of the bump detachment suppression ring 141 may be received in the ring groove 142, and the bump detachment suppression ring 141 may be formed to protrude from the ring groove 142 toward the rotary shaft 119.

The stopper 143 may be formed to protrude from the inner circumferential surface of the first bearing housing 1281 toward the rotary shaft 119. The stopper 143 may be positioned axially opposite to the bump detachment suppression ring 141.

The journal bearing 124 may be disposed between the stopper 143 and the bump detachment suppression ring 141.

The stopper 143 and the bump detachment suppression ring 141 may be arranged to overlap a portion of the bump foil 125 in the axial direction, thereby suppressing the journal bearing 124 from moving in the axial direction.

A protrusion height h1 of the stopper 143 may be lower than a bump height H of the bump foil 125 based on the inner circumferential surface of the first bearing housing 1281 on which the journal bearing 124 is mounted.

Here, the bump height H of the bump foil 125 refers to a distance from the inner circumferential surface of the first bearing housing 1281 to a vertex of the curved portion 1251 of the bump foil 125 in the radial direction toward the rotary shaft 119.

The protrusion height h1 of the stopper 143 refers to a length from the inner circumferential surface of the first bearing housing 128 to the top of the stopper 143 in the radial direction toward the rotary shaft 119.

The protrusion height h1 of the stopper 143 may limit the maximum elastic deformation of the bump foil 125 in the radial direction. The protrusion height h1 of the stopper 143 may also limit the radial movement distance of the rotary shaft 119.

According to this configuration, the stopper 143 may allow elastic deformation of the bump foil 125 in the radial direction within a certain range, but suppress damage due to small deformation of the journal bearing even when an impact exceeding a certain level is applied to the journal bearing 124.

The protrusion height h1 of the stopper 143 may be higher than a protrusion height h2 of the bump detachment suppression ring 141.

Here, the protrusion height h2 of the bump detachment suppression ring 141 refers to a length from the inner circumferential surface of the first bearing housing 1281 to the highest point of a circular cross-section of the ring body 1411, which protrudes outwardly from the ring groove 142.

When the protrusion height h1 of the stopper 143 is lower than the protrusion height h2 of the bump detachment suppression ring 141, the rotary shaft 119 may be brought into contact with the bump detachment suppression ring 141 before in contact with the stopper 143, during the radial movement of the rotary shaft 119.

The rotary shaft 119 may be damaged, for example, scratched, due to the contact with the bump detachment suppression ring 141.

Accordingly, the stopper 143 may suppress damage to the rotary shaft 119 by suppressing the contact between the rotary shaft 119 and the bump detachment suppression ring 141 during the radial movement of the rotary shaft 119.

The stopper 143 may include a wear-resistant coating layer made of polytetrafluoroethylene (PTFE), etc.

By forming the wear-resistant coating layer on an outer surface of the stopper 143, self-lubricating characteristics may be secured, and thus the stopper 143 may not cause damage to the rotary shaft 119 even when it is in contact with the rotary shaft 119.

The protrusion height h1 of the stopper 143 may be formed in the range of 40 to 50% of the bump height H. The bump foil may be elastically deformed in the range of 50 to 60% of the bump height H.

When the protrusion height h1 of the stopper 143 exceeds 50% of the bump height H, there may be a disadvantage in that the elastic deformation range of the journal bearing 124 is reduced and thereby the radial movement range of the rotary shaft 119 is reduced.

When the protrusion height h1 of the stopper 143 is less than 40% of the bump height H and is lower than the protrusion height h2 of the bump detachment suppression ring 141, there may be a problem in that the rotary shaft 119 is damaged, due to being brought into contact with the bump detachment suppression ring 141 before in contact with the stopper 143, during the radial movement of the rotary shaft 119.

The stopper 143 may be formed integrally with the first bearing housing 1281 or may be provided separately from the first bearing housing 1281 and coupled to the first bearing housing 1281. In the embodiment disclosed herein, the stopper 143 is shown formed integrally with the first bearing housing 1281.

The bump detachment suppression ring 141 and stopper 143 may be applied not only to the journal bearing 124 of the first bearing but also to the journal bearing 124 of the second bearing. Since the journal bearing 124 of the second bearing is equal or similar to the journal bearing 124 of the first bearing, a redundant description will be omitted.

The stopper 143 may be configured with a first stopper and a second stopper.

The first stopper may be disposed on one side of the journal bearing 124, and the second stopper may be disposed on another side of the journal bearing 124.

The journal bearing 124 may be arranged between the first stopper and the second stopper.

The first stopper and the second stopper may be formed to protrude from the inner circumferential surface of the bearing housing 128 toward the rotary shaft 119.

The first stopper and the second stopper may come into contact with the rotary shaft 119.

The first stopper and the second stopper may limit the radial movement range of the rotary shaft 119 to within the elastic deformation range of the journal bearing 124.

The first stopper and the second stopper may suppress the journal bearing 124 from being axially separated from the inner circumferential surface of the bearing housing 128. In this instance, the bump detachment suppression ring 141 may be omitted.

The first stopper and the second stopper may each have an outer surface on which a wear-resistant coating layer such as PTFE is formed.

(3) Journal Bearing Safety Device 2

Figure 6:
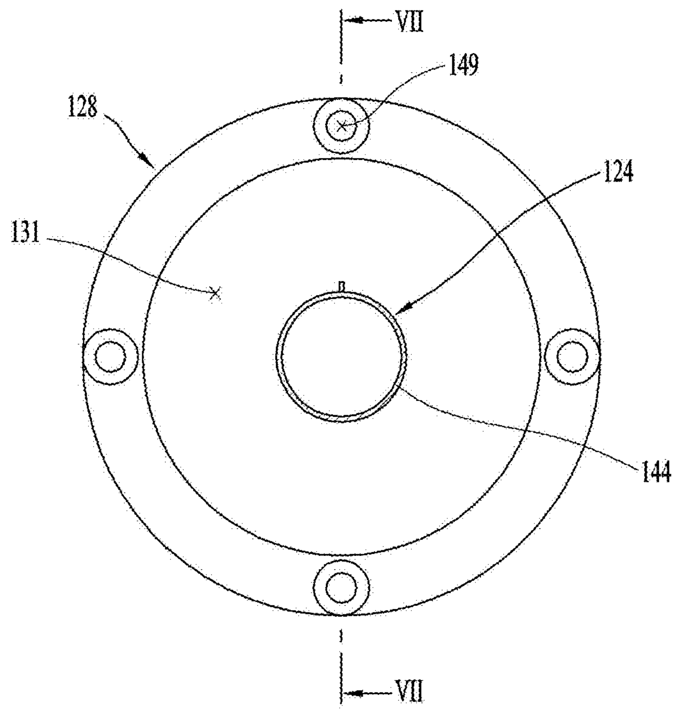
FIG. 6 is a conceptual view illustrating that a journal bearing safety device 2 according to another embodiment is mounted on a first bearing housing when viewed in an axial direction.

FIG. 6 is a conceptual view illustrating that a journal bearing safety device 2 according to another embodiment is mounted on the first bearing housing 1281 when viewed in an axial direction.

Figure 7:
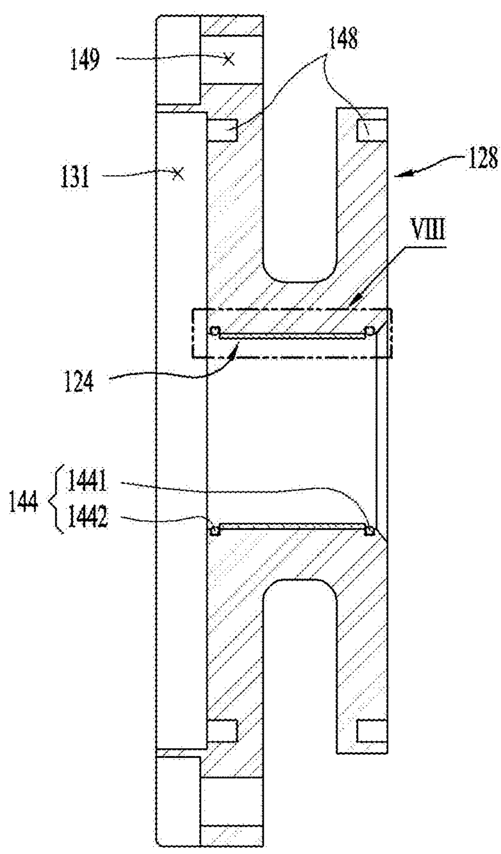
FIG. 7 is a cross-sectional view taken along the line VII-VII in FIG. 6.

FIG. 7 is a cross-sectional view taken along the line VII-VII in FIG. 6.

Figure 8:
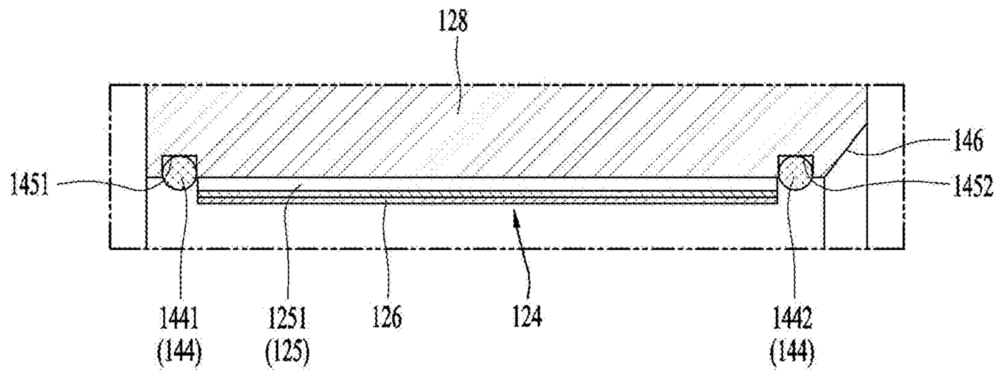
FIG. 8 is an enlarged view of a part VIII in FIG. 7.

FIG. 8 is an enlarged view of a part VIII in FIG. 7.

This embodiment differs from the embodiment of FIG. 5 in that a stop ring 144 is mounted on the first bearing housing 1281.

The stop ring 144 may be formed in a circular ring shape. The stop ring 144 may be formed in the shape of a closed loop. The stop ring 144 may extend continuously along the circumferential direction.

The stop ring 144 includes a stop ring body 1411 formed in a shape of a closed loop, and an axial through hole formed inside the stop ring body 1411. The axial through hole of the stop ring 144 may have a diameter larger than the diameter of the rotary shaft 119. The stop ring body 1411 may have a circular cross-sectional shape.

The stop ring 144 may be configured with a first stop ring 1441 and a second stop ring 1442. The first stop ring 1441 and the second stop ring 1442 may be arranged spaced apart from each other in the axial direction. The journal bearing 124 may be disposed between the first stop ring 1441 and the second stop ring 1442.

A first ring mounting groove 1451 and a second ring mounting groove 1452 may be concavely formed in the first bearing housing 1281. The first and second ring mounting grooves 1451 and 1452 may be axially spaced apart from each other in the inner circumferential surface of the first bearing housing 1281, on which the journal bearing 124 is mounted.

The first stop ring 1441 and the second stop ring 1441 may be mounted in the first ring mounting groove 1451 and the second ring mounting groove 1452, respectively.

A portion of the stop ring 131 may be received in the ring mounting groove, and another portion of the stop ring 131 may protrude to the outside of the ring mounting groove.

A protrusion height h1 of the stop ring 144 may be lower than the bump height H of the gas foil bearing (the bump foil 125) based on the inner circumferential surface of the first bearing housing 1281, on which the journal bearing 124 is mounted.

The stop ring 131 may further protrude toward the rotary shaft 119 than the inner circumferential surface of the first bearing housing 100, thereby limiting the journal bearing 124 from moving in the axial direction.

The stop ring 131 may limit the radial movement distance of the rotary shaft 119 to within the elastic deformation range of the journal bearing 124 even when an impact is applied to the bump foil 125 of the journal bearing 124 due to the radial movement of the rotary shaft 119.

In the embodiment disclosed herein, the first and second stop rings 1441 and 1442 are shown arranged on both sides of the journal bearing 124. However, the disclosure is not limited to this, and the stop ring 144 may be disposed on one side of the journal bearing 124, and the bump detachment suppression ring 141 may be disposed on another side of the journal bearing 124.

In this instance, the protrusion height h1 of the stop ring 131 may be shorter than the bump height H of the bump foil 125 of the journal bearing 124 based on the inner circumferential surface of the first bearing housing 1281 and higher than the height h2 of the bump detachment suppression ring 141.

The protrusion height h1 of the stop ring 131 may preferably be 40 to 50% of the bump height H of the bump foil 125 of the journal bearing 124. A wear-resistant coating layer may be formed on an outer surface of the stop ring 131.

The ring mounting groove 1451, 1452 may be positioned adjacent to one end of the inner circumferential surface of the bearing housing 128.

The first ring mounting groove 1451 may be formed in a front end portion of the inner circumferential surface of the bearing housing 128 facing the impeller 123, and the second ring mounting groove 1452 may be formed in a rear end portion of the inner circumferential surface of the bearing housing 128 facing an opposite direction to the impeller 123.

According to this configuration, when the ring mounting groove 1451, 1452 is arranged adjacent to one end of the inner circumferential surface of the bearing housing 128, the stop ring 131 may be easily assembled into or disassembled from the ring mounting groove 1451, 1452.

Additionally, a chamfer portion 146 may be formed on one end of the inner circumferential surface of the bearing housing 128. The ring mounting groove 1451, 1452 may be disposed adjacent to the chamfer portion 146. Through this, the stop ring 131 may be easily assembled into and disassembled from the ring mounting groove 1451, 1452 through the chamfer portion 146.

A radial sealing portion receiving groove 131 for receiving the first radial sealing portion 130 may be formed in the front surface of the first bearing housing 1281.

An O-ring mounting groove 148 may be formed in an inner surface of the radial sealing portion receiving groove 131. An O-ring may be mounted in the O-ring mounting groove 148 to maintain airtightness between the first radial sealing portion 130 and the first bearing housing 1281.

A fastening hole 149 may be formed in an outer circumferential portion of the first bearing housing 1281. The fastening hole 149 may be formed through the first bearing housing 1281 in the axial direction. A fastening member such as a screw may be fastened through the fastening hole 149. The fastening member may fasten the first bearing housing 1281 to the housing 100.

Since other components are the same as or similar to those in the embodiment of FIGS. 1 to 5, a redundant description will be omitted.

(4) Journal Bearing Safety Device 3

Figure 9:
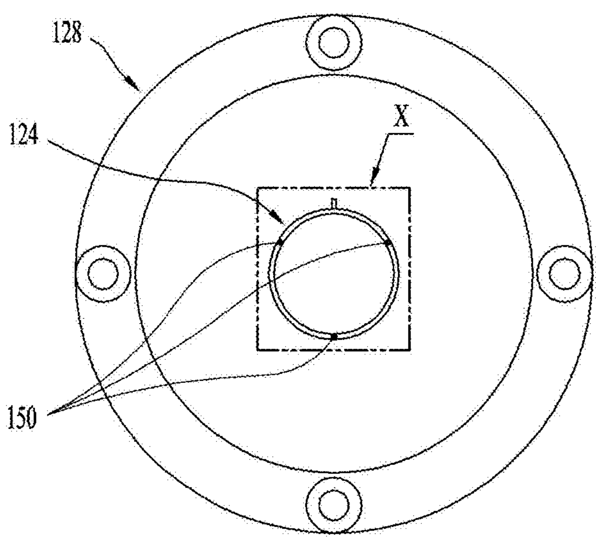
FIG. 9 is a conceptual view illustrating that a journal bearing safety device 3 according to still another embodiment is mounted on a first bearing housing when viewed in an axial direction.

FIG. 9 is a conceptual view illustrating that a journal bearing safety device 3 according to still another embodiment is mounted on a first bearing housing 1281 when viewed in an axial direction.

Figure 10:
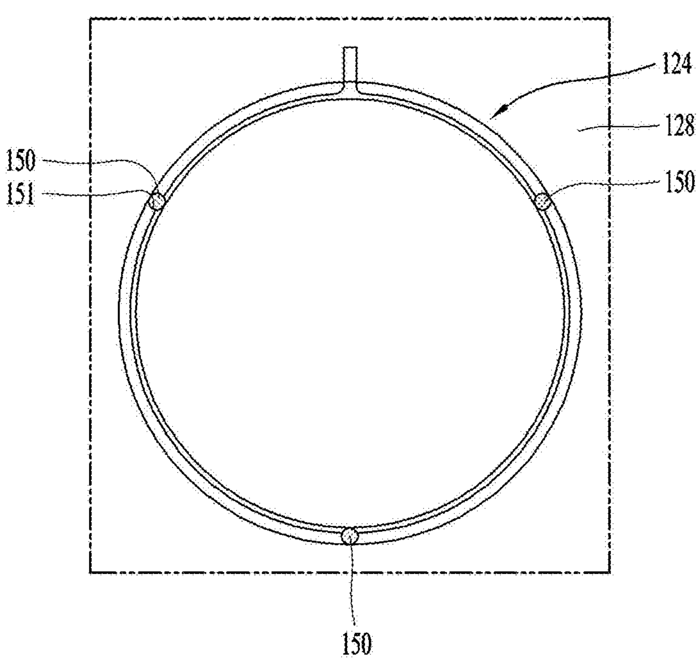
FIG. 10 is an enlarged view of a part X in FIG. 9.

FIG. 10 is an enlarged view of a part X in FIG. 9.

This embodiment differs from the embodiments of FIGS. 1 to 8 in that a ball bearing 150 is used as a safety device to suppress damage to the journal bearing 124.

The ball bearing 150 may be formed in a spherical shape. The ball bearing 150 may be provided in plurality.

A ball receiving groove 151 may be formed in the inner circumferential surface of the first bearing housing 1281. The ball receiving groove 151 may be formed to surround and support the ball bearing 150. The ball receiving groove 151 may be provided in plurality.

The plurality of ball bearings 150 may be configured with a first ball bearing 1501 and a second ball bearing 1502.

The first and second ball bearings 1501 and 1502 may be axially spaced apart from each other on the inner circumferential surface of the first bearing housing 1281 with the journal bearing 124 interposed therebetween.

The plurality of ball bearings 150 may be arranged at uniform intervals along the circumferential direction.

In the embodiment disclosed herein, the ball bearing 150 may be provided by three sets, each of which includes the first ball bearing 1501 and the second ball bearing 1502. The three sets of ball bearings 150 may be arranged apart from one another at an interval of 120 degrees in the circumferential direction.

Since other components are the same as or similar to those in the embodiment of FIGS. 1 to 8, a redundant description will be omitted.

(5) Journal Bearing Safety Device 4

Figure 11:
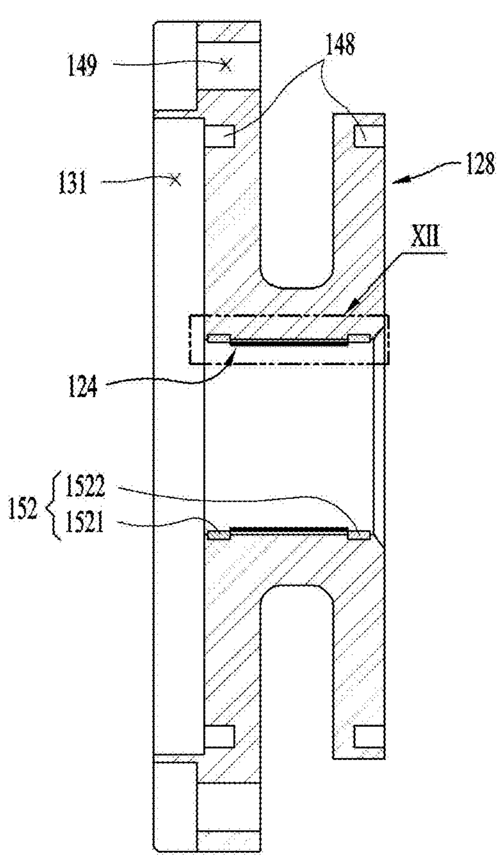
FIG. 11 is a conceptual view illustrating that a journal bearing safety device 4 according to still another embodiment is mounted on a first bearing housing when viewed in an axial direction.

FIG. 11 is a conceptual view illustrating that a journal bearing safety device 4 according to still another embodiment is mounted on the first bearing housing 1281 when viewed in an axial direction.

Figure 12:
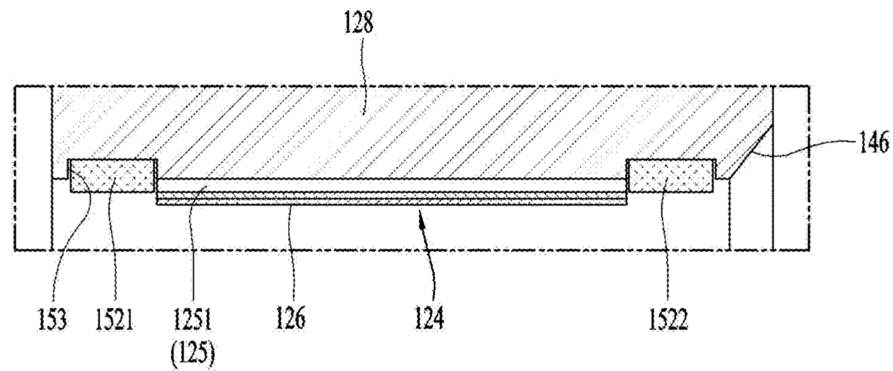
FIG. 12 is an enlarged view of a part XII in FIG. 11.

FIG. 12 is an enlarged view of a part XII in FIG. 11.

This embodiment differs from the embodiments of FIGS. 1 to 8 in that a needle bearing 152 is used as a safety device to suppress damage to the journal bearing 124.

The needle bearing 152 may be formed in the shape of a cylindrical roller whose length is long compared to its diameter. The needle bearing 152 may be provided in plurality.

The plurality of needle bearings 152 may be configured with a first needle bearing 1521 and a second needle bearing 1522.

The first and second needle bearings 1521 and 1522 may be axially spaced apart from each other on the inner circumferential surface of the first bearing housing 1281 with the journal bearing 124 interposed therebetween.

A needle receiving groove 153 may be formed in the inner circumferential surface of the first bearing housing 1281. The needle receiving groove 153 may be formed to surround and support the needle bearing 152. The needle receiving groove 153 may be provided in plurality.

The needle bearing 152 may be provided by a plurality of sets, each of which includes a first needle bearing 1521 and a second needle bearing 1522. The plurality of needle bearings 152 may be arranged at uniform intervals along the circumferential direction.

Since other components are the same as or similar to those in the embodiment of FIGS. 1 to 10, a redundant description will be omitted.

In the embodiments of FIGS. 6 to 11 described above, the stop ring 131, the ball bearing 150, and the needle bearing 152 of the journal bearing safety devices have been described as being arranged on one side and the another side of the journal bearing 124, respectively, but any one of the stop ring 131, the ball bearing 150, and the needle bearing 152 and the bump detachment suppression ring may be arranged on one side and another side of the journal bearing 124, respectively.

The journal bearing safety device may alternatively be configured by a combination of two different safety devices that are selected from among the stopper 143, the stop ring 131, the ball bearing 150, and the needle bearing 152.

Therefore, according to the disclosure, the journal bearing 124 may include a gas foil bearing mounted on the inner circumferential surface of the bearing housing 128, and may support the radial load of the rotary shaft 119 while forming an air gap from the rotary shaft 119.

The journal bearing safety device may be provided on the inner circumferential surface of the bearing housing 128. The journal bearing safety device may be configured to limit the radial movement range of the rotary shaft 119 to within the elastic deformation range of the journal bearing 124.

In one embodiment, the stopper 143 may be formed to protrude from the inner circumferential surface of the bearing housing 128 toward the rotary shaft 119. The stopper 143 may be in contact with the rotary shaft 119 to limit the radial movement of the rotary shaft 119. Accordingly, the stopper 143 may limit the radial movement distance of the rotary shaft 119, thereby suppressing plastic deformation of the journal bearing 124 even when the rotary shaft 119 exhibits abnormal behavior due to an abnormal operation, which is caused by external impact or liquid refrigerant, while the journal bearing 124 supports the radial load of the rotary shaft 119.

In addition, since the stopper 143 protrudes integrally from the inner circumferential surface of the bearing housing 128, there is no need to assemble additional components to suppress damage to the journal bearing 124. This may result in reducing the number of components and assembly processes, and also greatly reducing manufacturing costs.

In addition, the stopper 143 may form a structure protruding from the inner circumferential surface of the bearing housing 128, thereby improving durability through structural simplification.

Further, the protrusion height h1 of the stopper 143 protruding from the inner circumferential surface of the bearing housing 128 may be lower than the bump height H from the inner circumferential surface of the bearing housing 128 to the vertex of the curved portion 1251 of the gas foil bearing in the radial direction, and may be higher than the height h2 of the bump detachment suppression ring 141 protruding from the ring groove 142 toward the rotary shaft 119 based on the inner circumferential surface of the bearing housing 128.

Accordingly, even in the event of abnormal behavior of the rotary shaft 119, the radial movement of the rotary shaft 119 may be stopped by the stopper 143 before being in contact with the bump detachment suppression ring 141, thereby suppressing damage to the rotary shaft 119 due to the contact between the rotary shaft 119 and the bump detachment suppression ring 141.

Moreover, as other embodiments of the journal bearing safety device, stop rings 131, ball bearings 150, and needle bearings 152 may be applied.

Grooves may be formed in the inner circumferential surface of the bearing housing 128 such that the stop ring 131, the ball bearing 150, and the needle bearing 152 are coupled. The grooves may be arranged adjacent to the front or rear end of the inner circumferential surface of the bearing housing 128, and thus the stop ring 131, ball bearing 150, and needle bearing 152 may be easily assembled into or disassembled from the grooves.

Further, the ball bearings 150 and the needle bearings 152 may be spaced apart circumferentially along the inner circumferential surface of the bearing housing 128. Accordingly, the ball bearing 150 and the needle bearing 152 may have smaller contact areas with the rotary shaft 119 than the stop ring 131 extending circumferentially along the inner circumferential surface of the bearing housing 128.

Therefore, even when the rotary shaft 119 exhibits abnormal behavior due to external impact, etc., the ball bearing 150 or the needle bearing 152 may reduce the contact area through a point-contact or line-contact with the rotary shaft 119, thereby minimizing damages to the journal bearing 124 and the rotary shaft 119.

The stopper 143, the stop ring 131, the ball bearing 150, and the needle bearing 152 may each have a surface on which the wear-resistant coating layer is formed, thereby minimizing damages to the journal bearing 124 and the rotary shaft 119 due to the contact with the rotary shaft 119.

The stopper 143, the stop ring 131, the ball bearing 150, and the needle bearing 152 may also limit the radial movement range of the rotary shaft 119 to within the elastic deformation range of the journal bearing 124, thereby facilitating alignment between the journal bearing 124 and the rotary shaft 119.

3. Description of Configuration of Turbo Compressor According to Another Embodiment Hereinafter, a turbo compressor according to another embodiment will be described in detail with reference to the accompanying drawings.

Figure 13:
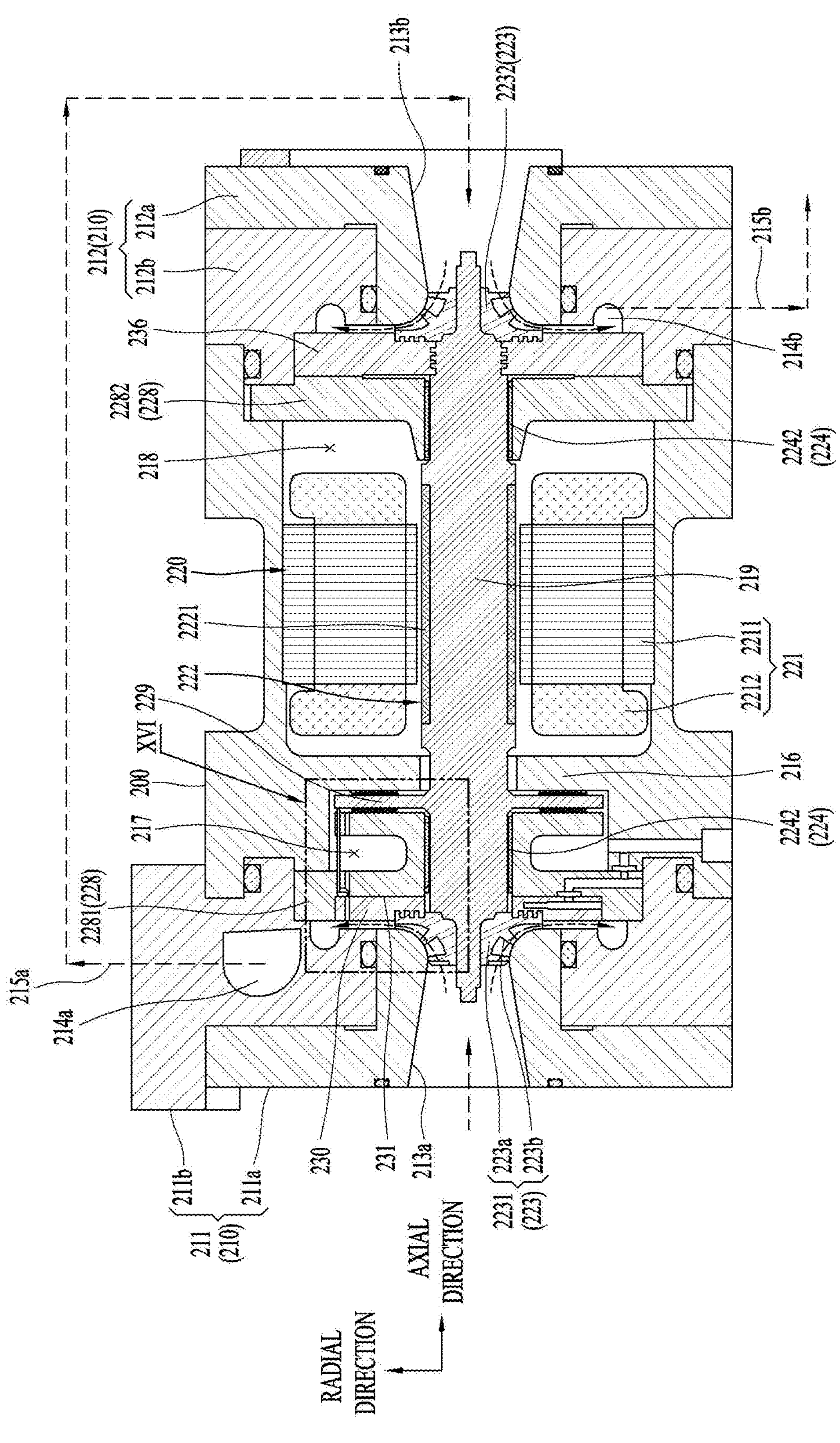
FIG. 13 is a conceptual view for explaining the configuration of a turbo compressor according to another embodiment.

FIG. 13 is a conceptual view for explaining the configuration of a turbo compressor according to another embodiment.

A turbo compressor according to the disclosure may include a housing 200, a motor part 220, a rotary shaft 219, an impeller 228, an impeller casing 211, 212, a bearing housing 128, a thrust bearing 227, and a journal bearing 224.

(1) Components of Compressor

The housing 200 may be formed in a cylindrical shape. The housing 200 may define the appearance of the turbo compressor.

Both sides of the housing 200 may be fastened to the impeller casing 211, 212.

An accommodation space may be defined inside the housing 200. The accommodation space of the housing 200 may be divided into a first space 217 and a second space 218. The first space 217 and the second space 218 may be partitioned by a barrier wall 216.

The barrier wall 216 may protrude radially from an inner circumferential surface of the housing 200 toward the rotary shaft 219. The barrier wall 216 may extend along the inner circumferential surface of the housing 200 in a circumferential direction. The barrier wall 216 may be formed in a circular plate shape having a preset thickness.

A shaft penetration hole may be formed through a central portion of the barrier wall 216 such that the rotary shaft 219 passes through it.

The barrier wall 216 may be positioned radially apart from the rotary shaft 219 at a preset interval.

The barrier wall 216 may be disposed to be biased from a longitudinal center of the housing 200 in one direction.

The first space 217 may be formed to be open toward one side of the housing 200, and the second space 218 may be formed to be open toward another side of the housing 200.

The first space 217 and the second space 218 may have different volumes from each other. The volume of the first space 217 may be smaller than the volume of the second space 218.

The motor part 220 to be explained later may be received in the second space 218 that has a relatively large volume. A portion of a first bearing housing 2281, which will be described later, may be received in the first space 217. A second bearing housing 2282, which will be described later, may be received in the second space 218.

The rotary shaft 219 may be horizontally disposed in the first space 217 and the second space 218, to axially pass through a radial center portion of the housing 200.

The motor part 220 includes a stator 221 and a rotor 222. The stator 221 may include a stator core 2211 and a stator coil 2212. The stator core 2211 may be formed in a cylindrical shape by stacking a plurality of electrical steel sheets.

The stator core 2211 may be provided with a plurality of teeth formed therein to protrude toward the rotary shaft 219 in the radial direction. A plurality of slots may be formed between the plurality of teeth. The plurality of teeth and the plurality of slots may be arranged alternately in the circumferential direction of the stator core 2211 and may be spaced apart from each other in the circumferential direction.

The stator coil 2212 may be wound on the stator core 2211 through the slots 102.

When power is applied to the stator coil 2212, a magnetic field may be generated around the stator coil 2212.

The rotor 222 may be arranged inside the stator 221. The rotor 222 may be positioned apart from the stator 221 with an air gap therebetween. The rotor 222 may be mounted on the rotary shaft 219 to be rotatable relative to the stator 221.

The rotor 222 may include a rotor core and permanent magnets 2221. The rotor core may be mounted to be rotatable together with the rotary shaft 219 or may be omitted. When the rotor core is omitted, the permanent magnets 2221 may be mounted on the rotary shaft 219.

The permanent magnets 2221 may be arranged on the rotary shaft 219 or the rotor core to radially overlap an inner surface of the stator 221 with an air gap. In the embodiment disclosed herein, the permanent magnets 2221 are shown mounted on the rotary shaft 219.

A rotor support portion may be disposed on the rotary shaft 219. The rotor support portion may be positioned on an axial center of the rotary shaft 219. The rotor support portion may be formed to be recessed into or protrude from the rotary shaft 219 in the radial direction.

The corresponding permanent magnet 2221 may be mounted to be received in the rotor support portion, or may be fixed between the plurality of rotor support portions so that its axial movement is limited by the protruded rotor support portions. In the embodiment disclosed herein, it is illustrated that the rotor support portions protrude radially from the rotary shaft 219, and the corresponding permanent magnet 2221 is fixedly positioned between the plurality of rotor support portions.

The permanent magnet 2221 may be formed in a cylindrical ring shape. The permanent magnet 2221 may have an inner diameter that is equal to a diameter of the rotary shaft 219. The permanent magnet 2221 may have an outer diameter that is smaller than an inner diameter of the stator core.

With the configuration, when power is applied to the stator 221, the rotor 222 may rotate relative to the stator 221 by electromagnetic interaction between the stator 221 and the rotor 222.

The rotary shaft 219 may transmit rotational force to an impeller 223 to be described later while rotating together with the rotor 222.

The rotary shaft 219 may be supported at both ends by bearings. The bearings may include a first bearing and a second bearing.

The first bearing may be configured to support one side of the rotary shaft 219. The first bearing may be disposed between the motor part 220 and a first-stage impeller to be described later. The first-stage impeller may be called a first impeller 2231.

The second bearing may be configured to support the other side of the rotary shaft 219. The second bearing may be disposed between the motor part 220 and a second-stage impeller to be described later. The second-stage impeller may be called a second impeller 2232.

The bearings may include a journal bearing 224 that supports a radial load of the rotary shaft 219, and a thrust bearing 227 that supports an axial load of the rotary shaft 219.

The first bearing may include a first journal bearing 2241, a first thrust bearing 2271, and a second thrust bearing 2272.

The second bearing may include a second journal bearing 2242.

The bearing housing 228 may include a first bearing housing 2281 and a second bearing housing 2282.

The first bearing housing 2281 may be configured to support the first bearing. However, the second thrust bearing 2272 may be supported on the barrier wall 216.

The first bearing housing 2281 may be formed in a cylindrical shape. The first bearing housing 2281 may have a circular pocket formed radially inward.

The first bearing housing 2281 may be positioned between a first impeller casing 211 to be described later and the barrier wall 216 of the housing 200. A portion of the first bearing housing 2281 may be accommodated in the first space 217 of the housing 200, and another portion of the first bearing housing 2281 may be accommodated inside the first impeller casing 211.

The first bearing housing 2281 may be press-fitted to the inside of the first impeller casing 211.

A first shaft hole may be formed inside the first bearing housing 2281 so that the rotary shaft 219 passes through it. The first shaft hole may have a diameter larger than the rotary shaft 219.

The first bearing may be mounted on the first bearing housing 2281.

The first journal bearing 2241 may be mounted to be received radially inside the first bearing housing 2281.

The second bearing housing 2282 may be configured to include a bearing receiving portion and a radial extension portion.

A second shaft hole formed in a cylindrical shape may be provided inside the bearing receiving portion. The rotary shaft 219 may pass axially through the second shaft hole. An outer circumferential surface of the bearing receiving portion may be inclined with respect to the axial direction.

The second journal bearing 2242 may be mounted on an inner surface of the bearing receiving portion. The second journal bearing 2242 may be arranged radially spaced apart from the rotary shaft 219 with a gap therebetween.

The radial extension portion may extend from an outer circumferential portion of the bearing receiving portion to protrude radially outward. The radial extension portion may extend in a circular plate shape along the circumferential direction.

The radial extension portion may be coupled to the inside of another end of the housing 200.

The bearing receiving portion may protrude axially from the radial extension portion toward the second space 218 of the housing 200.

According to this configuration, the first journal bearing 2241 and the second journal bearing 2242 may support the radial load of the rotary shaft 219.

The first thrust bearing 2271 may be mounted on an axial rear surface of the first bearing housing 2281.

A thrust runner 229 may be disposed on the rotary shaft 219. The thrust runner 229 may protrude radially from the rotary shaft 219 to the first space 217. The thrust runner 229 may rotate together with the rotary shaft 219.

The first thrust bearing 2271 may be arranged axially spaced apart at an interval from one axial side surface of the thrust runner 229.

The second thrust bearing 2272 may be mounted on the barrier wall 216. The second thrust bearing 2272 may be arranged spaced apart from an opposite side of the first thrust bearing 2271 with the thrust runner 229 therebetween.

The second thrust bearing 2272 may be arranged axially spaced apart at an interval from another axial side surface of the thrust runner 229.

The first thrust bearing 2271 and the second thrust bearing 2272 may support the axial load of the rotary shaft 219 with the thrust runner 229 therebetween.

The journal bearing 224 and the thrust bearing 227 according to the embodiment may each be implemented as a gas foil bearing.

The gas foil bearing may be configured to support the rotary shaft 219 by means of a working fluid.

The working fluid may be refrigerant, air, etc. In the embodiment disclosed herein, the working fluid may be refrigerant.

The gas foil bearing may be arranged spaced apart from the rotary shaft 219 with a preset gap (air gap).

A gas foil bearing may rotatably support the rotary shaft 219 by using a working fluid filled in the gap between the rotary shaft 219 and the bearing.

The bearing according to the disclosure may be spaced apart from the rotary shaft 219, to thus rotatably support the rotary shaft 219 in a non-contact manner. Accordingly, as the rotary shaft 219 rotates at high speed, an air gap may be stably formed between the rotary shaft 219 and the bearing, and the center of the rotary shaft 219 may be aligned with the center of the bearing. When the rotation speed increases, pressure of the air gap may increase by centrifugal force, thereby improving a shaft support capacity and implementing a high-efficiency compressor without friction. Noise and wear may also be reduced, thereby extending the lifespan of the bearing. The bearing according to the disclosure does not require lubricant, so there is no need for lubricant replacement and maintenance costs.

Figure 14:
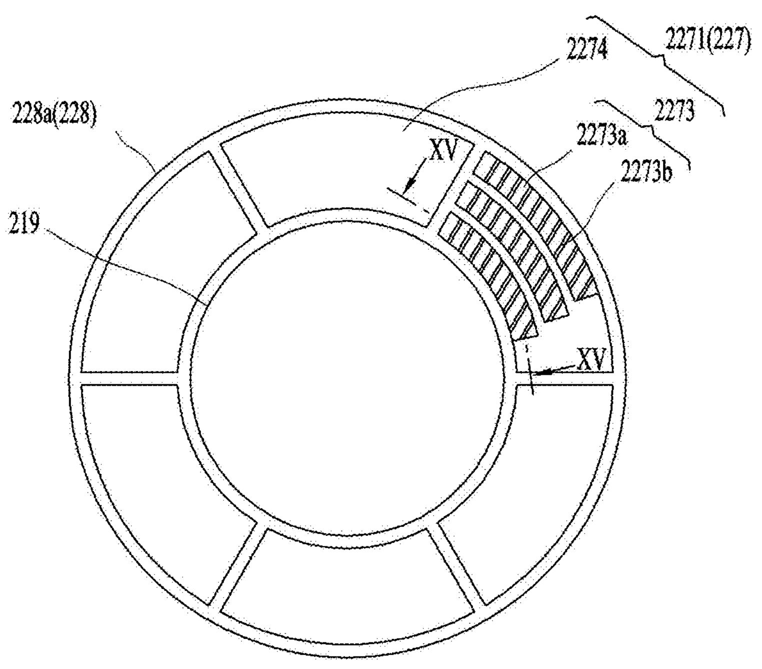
FIG. 14 is a conceptual view of a thrust bearing in FIG. 13 viewed in an axial direction.

FIG. 14 is a conceptual view of a thrust bearing 227 in FIG. 13 viewed in an axial direction.

Figure 15:
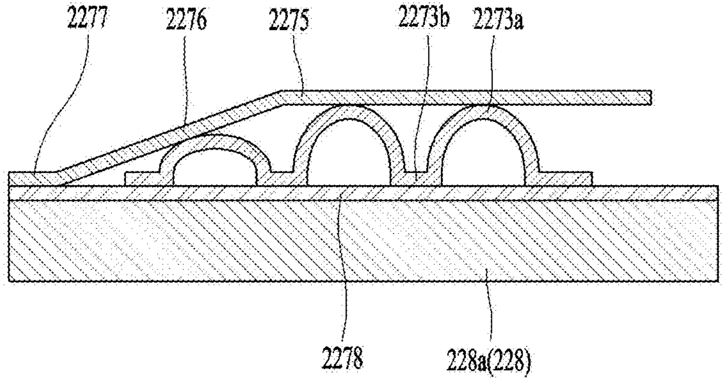
FIG. 15 is a cross-sectional view taken along the line XV-XV (curve in a circumferential direction) in FIG. 14.

FIG. 15 is a cross-sectional view taken along the line XV-XV (curve in a circumferential direction) in FIG. 14.

The thrust bearing 227 may be configured as a gas foil bearing. The thrust bearing 227 may be arranged to overlap the thrust runner 229 in the axial direction.

The thrust bearing 227 may be configured with a first thrust bearing 2271 and a second thrust bearing 2272 according to installation positions.

The first thrust bearing 2271 may be mounted on the rear surface of the first bearing housing 2281. The front surface of the first bearing housing 2281 may be positioned toward the first impeller 2231, and the rear surface of the first bearing housing 2281 may be positioned toward the thrust runner 229.

The second thrust bearing 2272 may be mounted on a front surface of the barrier wall 216. The front surface of the barrier wall 216 may be positioned toward the thrust runner 229, and the rear surface of the barrier wall 216 may be positioned toward the motor part 220.

The first thrust bearing 2271 and the second thrust bearing 2272 may be arranged axially apart from the thrust runner 229 at preset intervals.

The description regarding the thrust bearing 227 will be equally applied to the first thrust bearing 2271 and the second thrust bearing 2272.

The thrust bearing 227 may include a bump foil 2273, a cover foil 2274, and a bearing plate 2278.

The bump foil 2273 may be an elastic structure. The bump foil 2273 may be configured by forming a metal film in an embossed shape.

One side of the bump foil 2273 may be fixed to the bearing plate 2278, and another side of the bump foil 2273 may be a free end.

The bump foil 2273 may be configured with a plurality of curved portions 2273*a* and a plurality of connecting portions 2273*b*.

The curved portion 2273*a* may be formed in an arcuate shape or a semicircular shape. The connecting portion 2273*b* may be formed in a flat shape.

The connecting portion 2273*b* may be configured to connect one end and another end of two curved portions 2273*a* which are adjacent to each other.

The plurality of curved portions 2273*a* and the plurality of connecting portions 2273*b* may be arranged alternately along one direction. The plurality of curved portions 2273*a* and connecting portions 2273*b* may be formed as one body. In the embodiment disclosed herein, the plurality of curved portions 2273*a* and the plurality of connecting portions 2273*b* are shown alternately arranged along the circumferential direction of the thrust bearing 227.

The plurality of curved surfaces 2273*a* may be formed with the same radius.

The plurality of curved portions 2273*a* may be formed convexly in the same direction. The plurality of curved portions 2273*a* may be formed convexly toward the cover foil 2274 on the bearing plate 2278.

A direction in which the plurality of curved portions 2273*a* are formed convexly may be determined depending on a direction in which the bearing supports an axial load.

For example, as for the thrust bearing 227, the curved portion 2273*a* may be formed convexly in the axial direction, and as for the journal bearing, the curved portion 2273*a* may be formed convexly in the radial direction.

The curved portion 2273*a* of the thrust bearing 227 may be formed to be convex in the axial direction.

The cover foil 2274 may be disposed to cover the bump foil 2273. The cover foil 2274 may be named a top foil in that it is positioned to be contactable with the highest point of the bump foil 2273.

The cover foil 2274 may be arranged to face the thrust runner 229 and to be axially spaced apart from the thrust runner 229.

The cover foil 2274 may include a cover extension portion 2275, a cover inclined portion 272, and a cover fixing portion 2277.

The cover extension portion 2275 may be positioned to be contactable with the highest point of the curved portion 2273*a* of the bump foil 2273.

The cover fixing portion 2277 may be formed in a flat shape to fix the cover foil 2274 to the base plate.

The cover inclined portion 2276 may be formed to be inclined at a preset angle with respect to the bearing plate 2278 to connect the cover extension portion 2275 and the cover fixing portion 2277.

The bearing plate 2278 may be configured to fix the thrust bearing 227 to the first bearing housing 2281 or the barrier wall 216.

The cover fixing portion 2277 of the cover foil 2274 may be fixed to the bearing plate 2278, and the cover extension portion 2275 of the cover foil 2274 may be a free end.

The bearing plate 2278 may be formed as a circular plate. A through hole may be formed through the bearing plate 2278 so that the rotary shaft 219 may be inserted therethrough. The through hole of the bearing plate 2278 may have a diameter larger than the diameter of the rotary shaft 219.

When dividing the bearing plate 2278 into six equal parts along the circumferential direction, the cover foils 2274 may each be formed in a fan shape to have a size slightly smaller than ⅙ of the bearing plate 2278. The plurality of cover foils 2274 may be spaced apart in the circumferential direction of the bearing plate 2278, and one side of each cover foil 2274 may be fixed to the bearing plate 2278. However, the size of the cover foil 2274 is not limited thereto.

The plurality of bump foils 2273 may be positioned inside the cover foils 2274 divided into six equal parts along the circumferential direction of the bearing plate 2278. The bump foils 2273 may extend in the circumferential direction of the bearing plate 2278.

The plurality of bump foils 2273 may be disposed spaced apart from one another in the radial direction of the bearing plate 2278. However, the bump foil 2273 may be formed to correspond to the size of the cover foil 2274, and one bump foil 2273 may be provided for each cover foil 2274.

According to this configuration, even when an axial load transmitted to the rotary shaft 219 by refrigerant suction pressure of the impeller 223 acts on the thrust runner 229, the first thrust bearing 2271 and the second thrust bearing 2272 may rotatably support the axial load of the rotary shaft 219 by utilizing elastic force of the bump foil 2273.

The turbo compressor may compress refrigerant in multiple stages depending on the number of impellers 128. In the embodiment disclosed herein, the turbo compressor is implemented as a two-stage compressor.

The impeller 223 may be classified into a first impeller 2231 to an Nth impeller according to a compression order of refrigerant. In the embodiment disclosed herein, the impeller 223 is shown including a first impeller 2231 and a second impeller 2232. The first impeller 2231 may be named a first-stage impeller 123, and the second impeller 2232 may be named a second-stage impeller.

Unless the first impeller 2231 and the second impeller 2232 are separately distinguished in the specification, a description of the configuration of the impeller 223 may also be applied to the first impeller 2231 and the second impeller 2232.

A fluid such as refrigerant and/or air may be subjected to a first-stage compression in the first impeller 2231 and a second-stage compression in the second impeller 2232.

The impeller 223 may be mounted on the rotary shaft 219 to be rotatable together with the rotary shaft 219. The impeller 223 may rotate by receiving force from the motor part 220 through the rotary shaft 219.

The impeller 223 may suction a fluid such as refrigerant and compress the fluid such as the refrigerant during rotation together with the rotary shaft 219.

A first impeller support portion and a second impeller support portion may be disposed on both ends of the rotary shaft 219.

The first impeller support portion may have a diameter smaller than the diameter of the rotary shaft 219 and may protrude axially from one end of the rotary shaft 219. The first impeller support portion may be press-fitted to the inside of a hub 223*a* of the first impeller 2231.

The second impeller support portion may have a diameter smaller than the diameter of the rotary shaft 219 and may protrude axially from another end of the rotary shaft 219. The second impeller support portion may be press-fitted to the inside of a hub 223*a* of the second impeller 2232.

The impeller 223 may include a hub 223*a* and a plurality of blades 223*b*.

The hub 223*a* may include a through hole formed through an inside thereof and the rotary shaft 219 may pass through the through hole. The hub 223*a* may be formed in a conical shape. An outer circumferential surface of the hub 223*a* may be formed to be inclined with respect to the axial direction. The hub 223*a* may be formed such that a diameter thereof increases from the front end of the hub 223*a* to the rear end in the axial direction with respect to a suction direction of a working fluid.

The plurality of blades 223*b* may protrude spirally from the outer circumferential surface of the hub 223*a*. The plurality of blades 223*b* may be arranged spaced apart from each other in the circumferential direction of the hub 223*a*.

According to this configuration, the impeller 223 may suction gas such as refrigerant in the axial direction and discharge the suctioned gas in a centrifugal direction of the impeller 223.

A first impeller casing 211 may be fastened to one side of the housing 200. An axial rear surface of the first impeller casing 211 may be covered with the first bearing housing 2281 received in one side of the housing 200.

A second impeller casing 112 may be fastened to another side of the housing 200. An axial rear surface of the second impeller casing 112 may be covered with the second bearing housing 2282 received in another side of the housing 200. The axial rear surfaces of the first impeller casing 211 and the second impeller casing 112 refer to the downstream side of the impeller casing based on a flow direction of refrigerant.

The first impeller casing 211 may include a suction port 213*a*, 213*b*, a diffuser 214*a*, 214*b*, and a discharge port 215*a*, 215*b*.

The suction port 213*a*, 213*b* may be formed through a center of the first impeller casing 211 in the axial direction. One side of the suction port 213*a*, 213*b* may communicate with the outside of the first impeller casing 211, and another side of the suction port 213*a*, 213*b* may communicate with the inside of the first impeller casing 211.

The first impeller 2231 may be received inside the suction port 213*a*, 213*b*. The first impeller 2231 may be mounted on the first impeller support portion and may rotate together with the rotary shaft 219.

The suction port 213*a*, 213*b* may be formed so that its diameter decreases from one axial side to another axial side. Accordingly, a flow rate of refrigerant that is suctioned through the suction port 213*a*, 213*b* may increase.

The diffuser 214*a*, 214*b* may be formed to be axially recessed into the axial rear surface of the first impeller casing 211. The diffuser 214*a*, 214*b* may be formed inside the first impeller casing 211. The diffuser 214*a*, 214*b* may be arranged between the suction port 213*a*, 213*b* and the discharge port 215*a*, 215*b*.

The diffuser 214*a*, 214*b* may be formed to extend in a spiral direction from the suction port 213*a*, 213*b*. The diffuser 214*a*, 214*b* may be connected to communicate with the suction port 213*a*, 213*b* and the discharge port 215*a*, 215*b*. The diffuser 214*a*, 214*b* may be formed so that a size of a passage (flow path) increases from the suction port 213*a*, 213*b* to the discharge port 215*a*, 215*b*.

According to this configuration, as the size of the passage in the diffuser 214*a*, 214*b* increases, pressure of a working fluid that is suctioned by the rotation of the impeller 223 may increase while passing through the diffuser 214*a*, 214*b*.

That is, the diffuser 214*a*, 214*b* may increase pressure of refrigerant by converting kinetic energy of the refrigerant suctioned through the suction port 213*a*, 213*b* into pressure energy.

The discharge port 215*a*, 215*b* may be disposed on an outer peripheral portion of the first impeller casing 211. The discharge port 215*a*, 215*b* may extend radially from the diffuser 214*a*, 214*b*. A discharge pipe may be formed to protrude outward from the outer circumferential portion of the first impeller casing 211.

The discharge pipe may be connected such that one side thereof communicates with the discharge port 215*a*, 215*b* and another side communicates with the outside of the first impeller casing 211.

The second impeller casing 112 may include a suction port 213*a*, 213*b*, a diffuser 214*a*, 214*b*, and a discharge port 215*a*, 215*b*. The suction port 213*a*, 213*b*, the diffuser 214*a*, 214*b*, and the discharge port 215*a*, 215*b* of the second impeller casing 112 are equal or similar to the suction port 213*a*, 213*b*, the diffuser 214*a*, 214*b*, and the discharge port 215*a*, 215*b* of the first impeller casing 211, so a redundant description will be omitted.

However, for a second-stage compression, the discharge pipe of the first impeller casing 211 may be connected to the suction port 213*a*, 213*b* of the second impeller casing 112 through a connection pipe (not illustrated).

Each of the first impeller casing 211 and the second impeller casing 112 may be configured to be separated into two parts.

One part may be a suction part 211*a*, 212*a*. The suction part 211*a*, 212*a* may be formed to have a T-like cross-sectional shape. The suction part 211*a*, 212*a* may be configured with a radial portion extending in the radial direction and an axial portion extending in the axial direction. The suction port 213*a*, 213*b* may be formed inside the axial portion of the suction part 211*a*, 212*a*.

A downstream portion of the suction part 211*a*, 212*a* may be formed to be curved in an arcuate shape. The downstream portion of the suction part 211*a*, 212*a* may be configured to receive the impeller 223.

Another part may be a diffuser part 211*b*, 212*b*. The diffuser part 211*b*, 212*b* may be formed to surround an outer circumference and a rear surface of the radial portion of the suction part 211*a*, 212*a* and an outer circumferential surface of the axial portion. The suction part 211*a*, 212*a* and the diffuser part 211*b*, 212*b* may be coupled to each other.

The rear surface of the radial portion of the suction part 211*a*, 212*a* refers to a downstream surface based on a suction direction of refrigerant.

To suppress refrigerant leakage, a radial sealing member and an axial sealing member may be provided.

The radial sealing member may be disposed between the bearing housing 228 and the impeller 223. In this embodiment disclosed herein, the radial sealing member is shown arranged between the first bearing housing 2281 and the impeller 223.

The radial sealing member may be configured with a first radial sealing portion 230 and a second radial sealing portion 234.

For example, the first radial sealing portion 230 may be arranged on one axial side surface of the first bearing housing 2281.

The first radial sealing portion 230 may be formed integrally on one axial side surface of the first bearing housing 2281 or may be coupled to the one axial side surface of the first bearing housing 2281.

In the embodiment disclosed herein, the first radial sealing portion 230 is shown coupled to one axial side surface of the first bearing housing 2281. To this end, a sealing portion receiving groove 231, in which the first radial sealing portion 230 is received, may be formed to be axially recessed into the one axial side surface of the first bearing housing 2281.

The first radial sealing portion 230 may include a plurality of sealing grooves 232 and a plurality of first land portions 233.

The plurality of sealing grooves 232 may be formed to be axially recessed into one axial side surface (front surface) of the first radial sealing portion 230 in an opposite direction to the impeller 223. The plurality of sealing grooves 232 may extend along the circumferential direction of the first radial sealing portion 230.

The front surface of the first radial sealing portion 230 may refer to a surface facing the impeller 223.

The plurality of sealing grooves 232 may be arranged in a spaced manner in the radial direction of the first radial sealing portion 230.

The plurality of sealing grooves 232 may be arranged to overlap the impeller 223 in the axial direction.

The plurality of first land portions 233 may be arranged between the plurality of sealing grooves 232.

The plurality of sealing grooves 232 and the plurality of first land portions 233 may be alternately arranged in the radial direction of the first radial sealing portion 230.

Each of the plurality of sealing grooves 232 and the plurality of first land portions 233 may be formed in an annular shape. However, a radial width of the sealing groove 232 and a radial thickness of the first land portion 233 may be formed differently.

A second radial sealing portion 234 may be disposed on another axial side surface (rear surface) of the first impeller 2231. The rear surface of the first impeller 2231 may be a surface facing the first radial sealing portion 230.

The second radial sealing portion 234 may be arranged at a downstream side of the first impeller 2231 based on a flow direction of refrigerant. The second radial sealing portion 234 may rotate together with the first impeller 2231.

The second radial sealing portion 234 may include a plurality of sealing protrusions 235.

The plurality of sealing protrusions 235 may be formed to protrude axially from the another axial side surface of the hub 223*a* of the first impeller 2231 toward the first radial sealing portion 230. The plurality of sealing protrusions 235 may be received in the plurality of sealing grooves 232, respectively.

The sealing protrusion 235 may be received in the sealing groove 232, but may be arranged to be spaced apart from an inner surface of the sealing groove 232 at preset intervals in the axial direction and the radial direction.

The sealing protrusion 235 may extend along the circumferential direction of the hub 223*a* and may be formed in an annular shape.

The plurality of sealing protrusions 235 and the plurality of first land portions 233 may be arranged to overlap each other in the radial direction.

According to this configuration, as the plurality of sealing protrusions 235 and the plurality of first land portions 233 are arranged to overlap each other in the radial direction, leakage of refrigerant discharged from the impeller 223 to the diffuser 214*a*, 214*b* may be suppressed.

For example, when the impeller 223 rotates, the plurality of blades 223*b* may rotate around the hub 223*a*, so that the impeller 223 may discharge refrigerant suctioned through a space between the plurality of blades 223*b* toward the diffuser 214*a*, 214*b* in the radial direction.

Here, the plurality of sealing protrusions 235 and first land portions 233 may act as flow resistance of refrigerant, which flows from the diffuser 214*a*, 214*b* toward the downstream side of the impeller 223, thereby suppressing the refrigerant from flowing backward to a radial inside through a gap between the sealing groove 232 of the first radial sealing portion 230 and the rear surface of the impeller 223.

The radial sealing member may also be equally applied between the second bearing housing 2282 and the second impeller 2232.

The axial sealing member may be disposed between the second bearing housing 2282 and the second impeller casing 112. The axial sealing member may be configured with a first axial sealing portion 236 and a second axial sealing portion.

The first axial sealing portion 236 may be disposed inside the diffuser part 211*b*, 212*b* of the second impeller casing 112. The first axial sealing portion 236 may be coupled between the second bearing housing 2282 and the diffuser part 211*b*, 212*b* of the second impeller casing 112.

The first axial sealing portion 236 may include a plurality of sealing grooves. The plurality of sealing grooves may be formed to be radially recessed into an inner surface of the first axial sealing portion 236, more specifically, into an inner surface of the bearing receiving portion.

The sealing groove may be formed in an annular shape. The sealing groove may extend circumferentially along an inner circumference of the first axial sealing portion 236.

The plurality of sealing grooves may be disposed to be axially spaced apart from one another inside the first axial sealing portion 236. A plurality of second land portions may be positioned between the plurality of sealing grooves. The plurality of sealing grooves and the plurality of second land portions may be arranged alternately to be spaced apart from each other along the axial direction in the inner surface of the first axial sealing portion 236.

The second axial sealing portion may be disposed on another side of the rotary shaft 219. The second axial sealing portion may rotate together with the first impeller 2231. The second axial sealing portion may be arranged to overlap the sealing groove in the radial direction to be received in the sealing groove.

The second axial sealing portion may include a plurality of sealing protrusions.

The plurality of sealing protrusions may be formed to protrude radially outward from an outer circumferential surface of the rotary shaft 219 toward the inner surfaces of the sealing grooves. The plurality of sealing protrusions may be formed in an annular shape.

The plurality of sealing protrusions may be arranged axially spaced apart from one another on the rotary shaft 219.

The plurality of sealing protrusions and the plurality of second land portions may be alternately arranged along the axial direction of the rotary shaft 219. The plurality of sealing protrusions and the plurality of second land portions may be arranged to be spaced apart from each other at a preset interval.

The plurality of second land portions may be positioned radially apart from the rotary shaft 219 at a preset interval.

The plurality of sealing protrusions may be positioned radially spaced apart from the inner surface of the first axial sealing portion 236 at a preset interval.

The plurality of sealing protrusions and the plurality of second land portions may be arranged to overlap each other in the axial direction.

According to this configuration, as the plurality of sealing protrusions and the plurality of second land portions are arranged to overlap each other in the axial direction, leakage of fluid such as refrigerant suctioned by the second impeller 2232 may be suppressed.

For example, when the second impeller 2232 rotates, the plurality of blades 223*b* may rotate around the hub 223*a*, so that the second impeller 2232 may axially suction refrigerant through a space between the plurality of blades 223*b*.

Here, the plurality of sealing protrusions and the plurality of second land portions may act as flow resistance of refrigerant, which flows through the gap between the first axial sealing portion 236 and the rotary shaft 219, thereby suppressing leakage of the refrigerant through the gap between the inner surface of the first axial sealing portion 236 and the rotary shaft 219.

The axial sealing member may also be applied equally between the first bearing housing 2281 and one side of the rotary shaft 219.

(2) Thrust Bearing Safety Device 1

Figure 16:
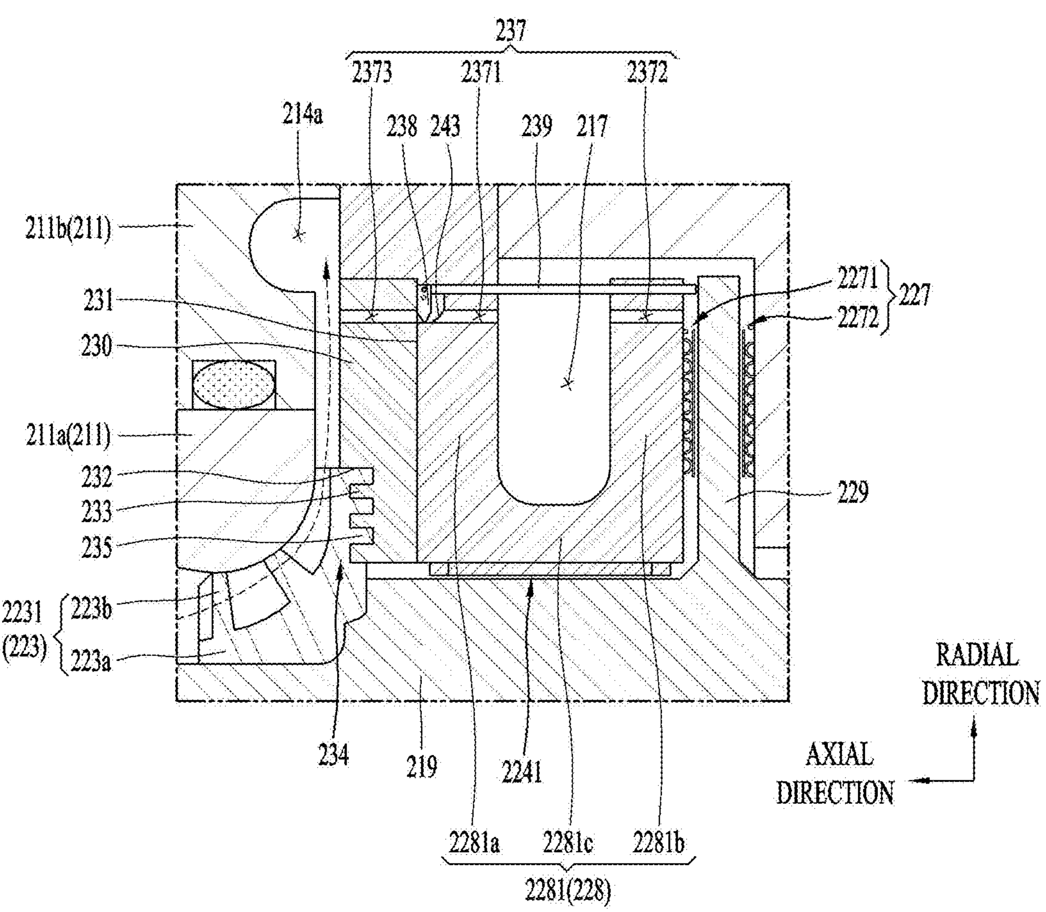
FIG. 16 is a conceptual view for explaining the thrust bearing safety device 1 by enlarging a part XVI in FIG. 13.

FIG. 16 is a conceptual view for explaining the thrust bearing safety device 1 by enlarging a part XVI in FIG. 13.

Figure 17:
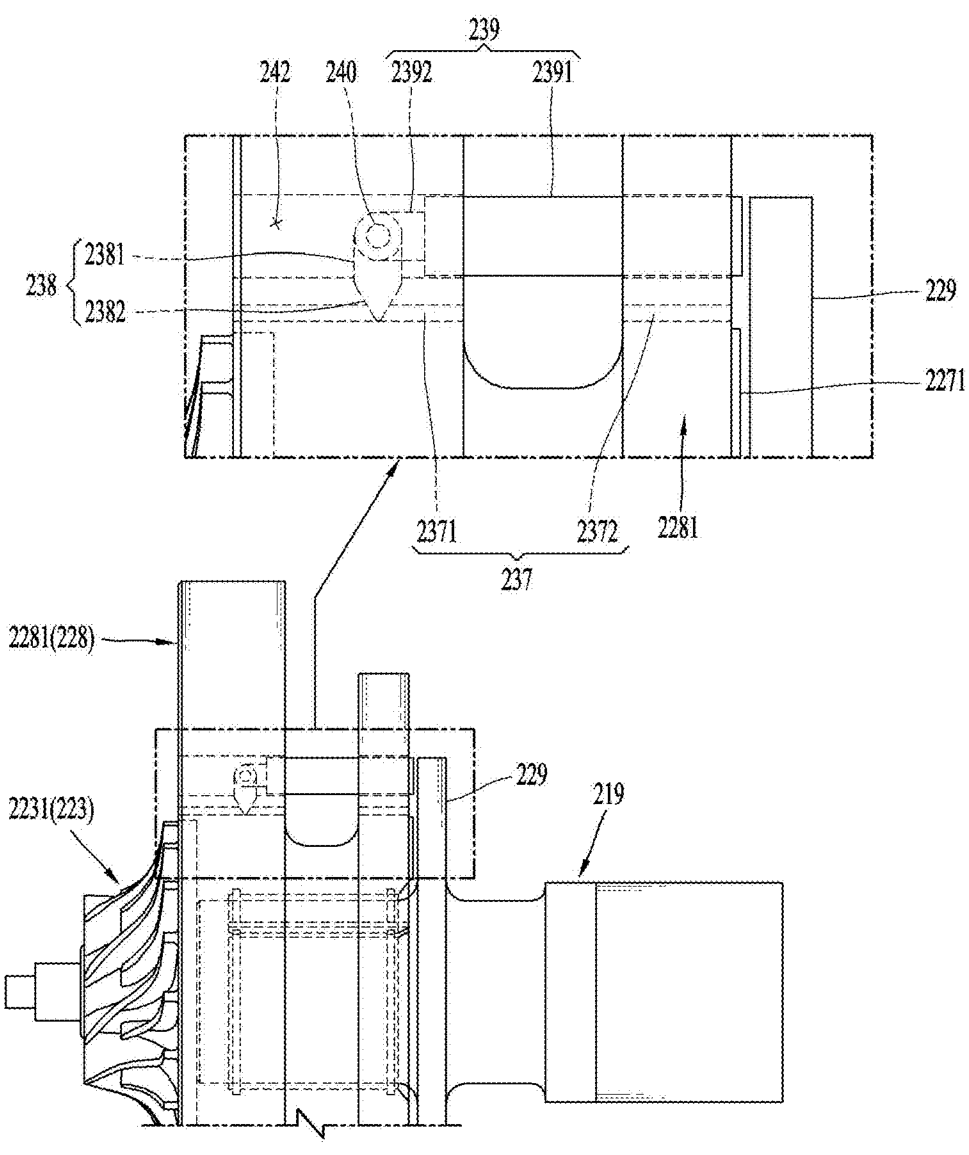
FIG. 17 is a conceptual view illustrating a more specific embodiment of the thrust bearing safety device 1 in FIG. 16.

FIG. 17 is a conceptual view illustrating a more specific embodiment of the thrust bearing safety device 1 in FIG. 16.

Figure 18:
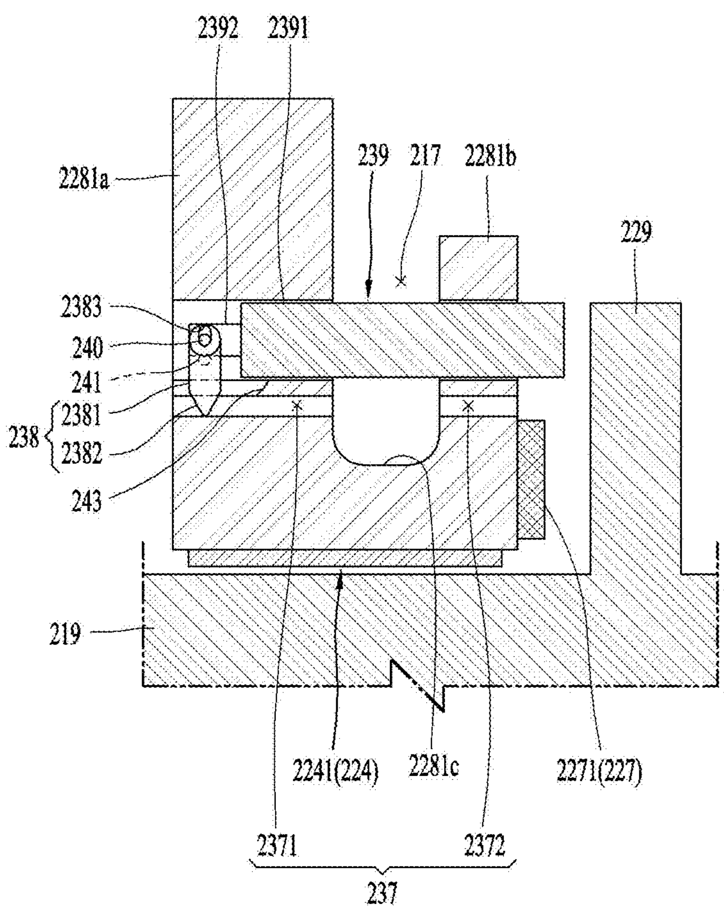
FIG. 18 is a cross-sectional view of the thrust bearing safety device 1 in FIG. 17 before operation.

FIG. 18 is a cross-sectional view of the thrust bearing safety device 1 in FIG. 17 before operation.

Figure 19:
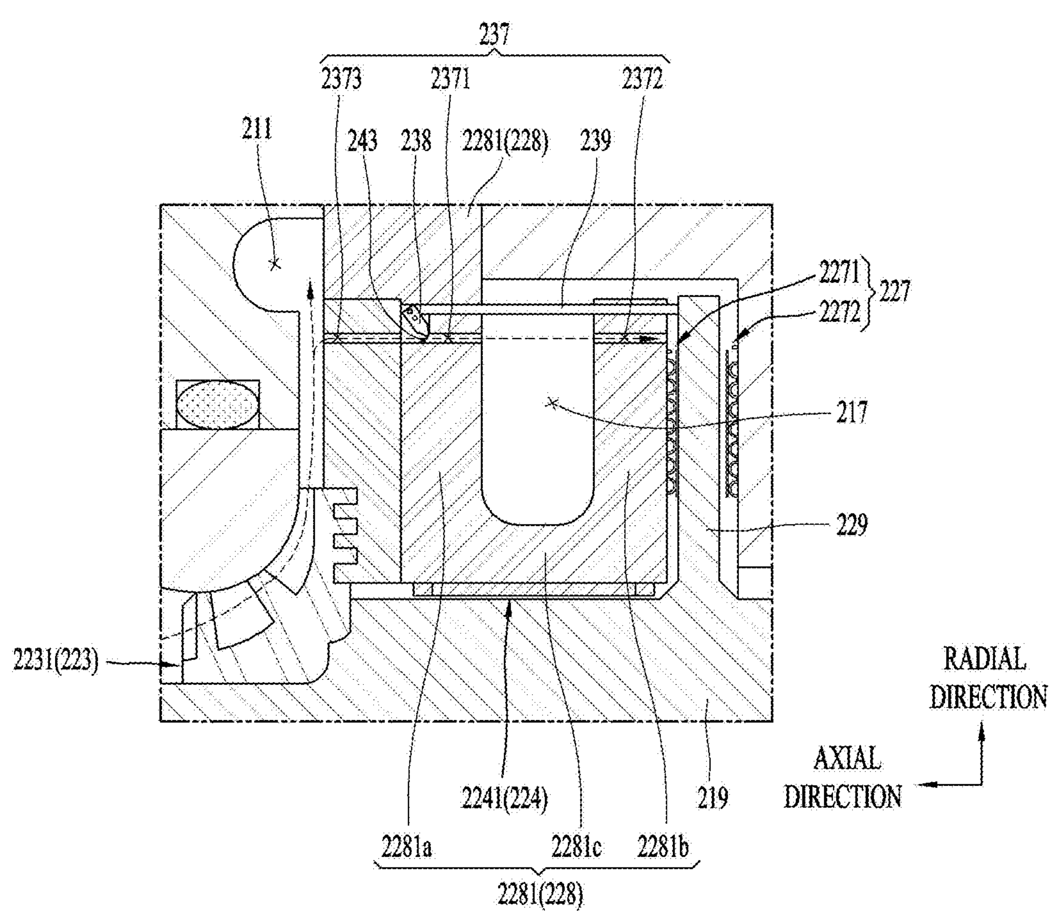
FIG. 19 is a conceptual view of the thrust bearing safety device 1 in FIG. 16 after operation.

FIG. 19 is a conceptual view of the thrust bearing safety device 1 in FIG. 16 after operation.

Figure 20:
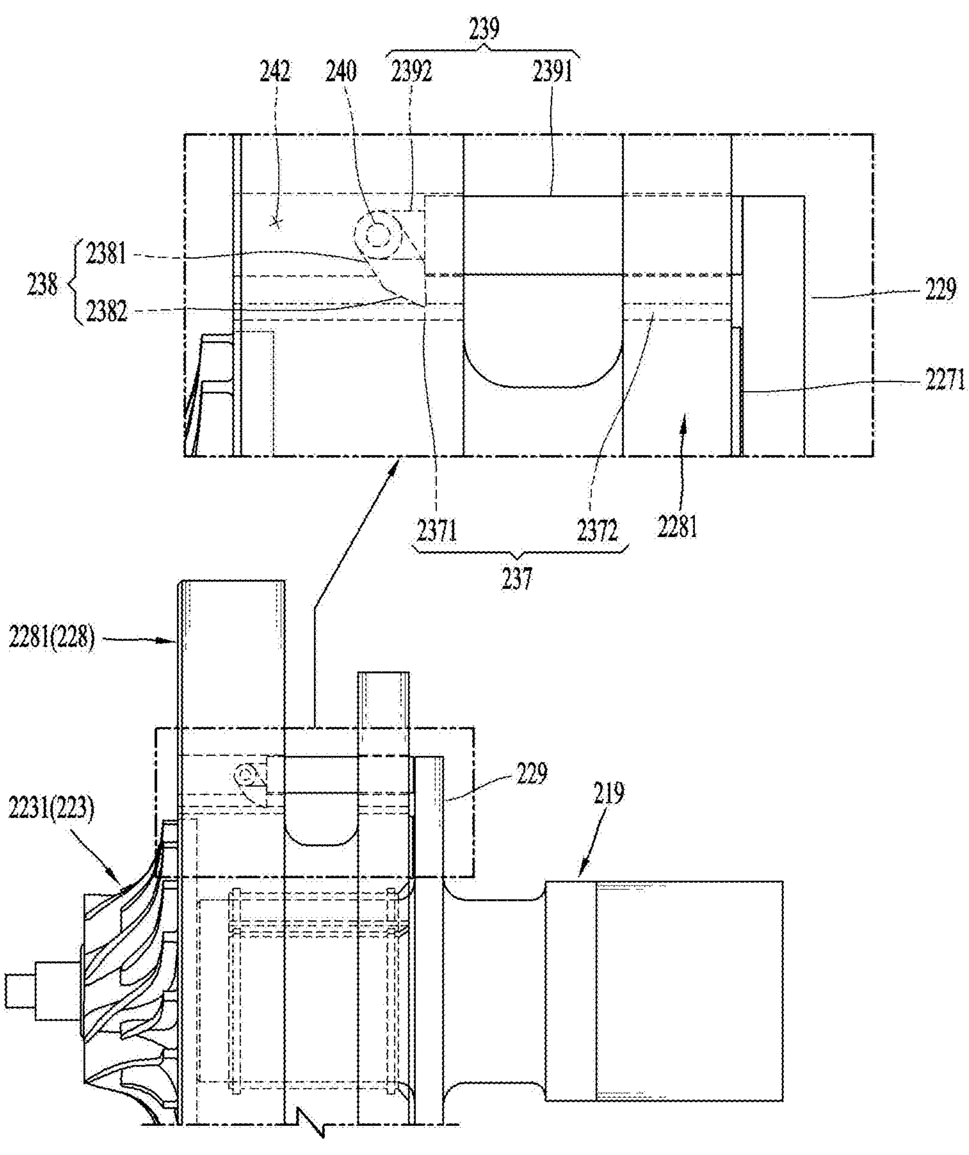
FIG. 20 is a detailed conceptual view of the thrust bearing safety device 1 in FIG. 19 after operation.

FIG. 20 is a detailed conceptual view of the thrust bearing safety device 1 in FIG. 19 after operation.

Figure 21:
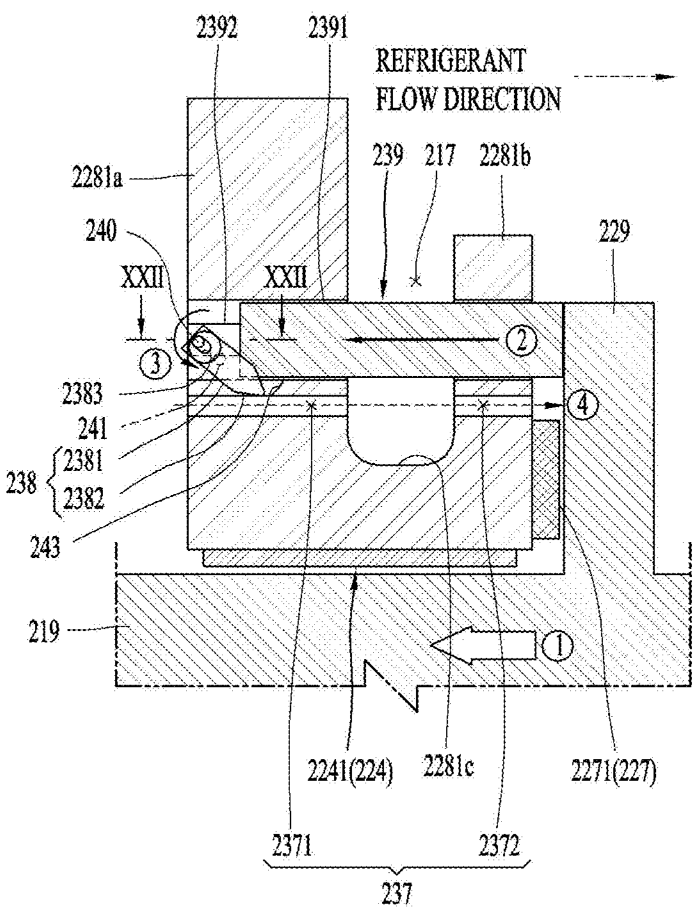
FIG. 21 is a detailed cross-sectional view of the thrust bearing safety device 1 in FIG. 20 after operation.

FIG. 21 is a detailed cross-sectional view of the thrust bearing safety device 1 in FIG. 20 after operation.

Figure 22:
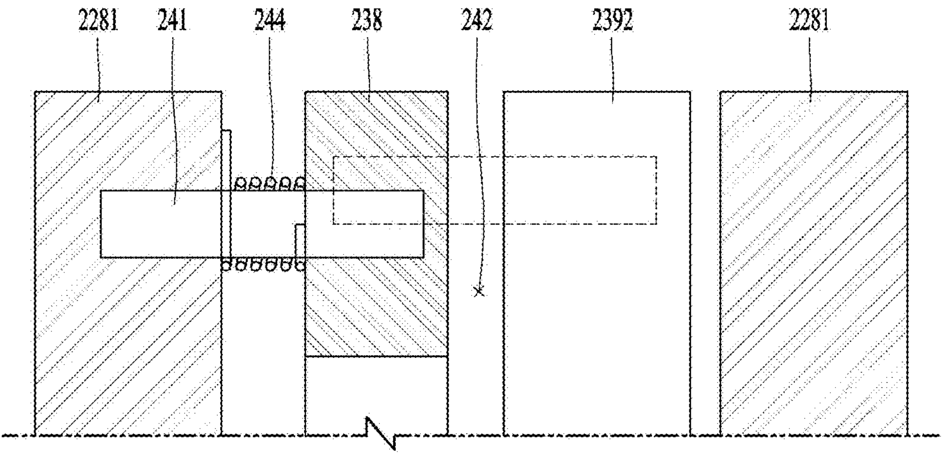
FIG. 22 is a conceptual view taken along the line XXII-XXII in FIG. 21 to explain a coupled state between an opening and closing valve and a hinge pin.

FIG. 22 is a conceptual view taken along the line XXII-XXII in FIG. 21 to explain a coupled state between an opening and closing valve 238 and a hinge pin 241.

The suction port of the first impeller casing 211 may be connected to an evaporator or accumulator (or gas-liquid separator) of a refrigeration cycle device. The suction port of the second impeller casing 112 may be connected to the discharge port of the first impeller casing 211.

Pressure of refrigerant suctioned into the second impeller 2232 (or the second-stage impeller) may be greater than pressure of refrigerant suctioned into the first impeller 2231.

The axial load acting on one side of the rotary shaft 219 on which the first impeller 2231 is mounted may be smaller than the axial load acting on another side of the rotary shaft 219 on which the second impeller 2232 is mounted.

The rotary shaft 219 may move axially from the first impeller 2231 toward the second impeller 2232.

The thrust runner 229 may move toward the first bearing housing 2281, and may damage an oil film, which is formed in the gap between the first thrust bearing 2271 mounted on the first bearing housing 2281 and the thrust runner 229, or may cause damage to the first thrust bearing 2271 by applying an impact to the first thrust bearing 2271.

To solve this problem, a bypass passage 237 may be disposed.

The bypass passage 237 may be formed such that the diffuser 214*a*, 214*b* of the first impeller casing 211 communicates with the inside of the housing.

One side of the bypass passage 237 may communicate with the diffuser 214*a*, 214*b* of the first impeller casing 211, and another side of the bypass passage 237 may be connected to communicate with the first space 217 of the housing. The another side of the bypass passage 237 may be connected to communicate with a gap between the first thrust bearing 2271 and the thrust runner 229.

The first bearing housing 2281 may include a first radial extension portion 2281*a*, a second radial extension portion 2281*b*, and an axial connection portion 2281*c*.

The axial connection portion 2281*c* may be formed in a cylindrical shape. A first shaft hole may be formed through the inside of the axial connection portion 2281*c* so that the rotary shaft 219 passes through it.

The first radial extension portion 2281*a* may extend radially from one side of the axial connection portion 2281*c* and may be formed in a circular plate shape. The second radial extension portion 2281*b* may extend radially from another side of the axial connection portion 2281*c* and may be formed in a circular plate shape.

The first radial extension portion 2281*a* and the second radial extension portion 2281*b* may be arranged spaced apart from each other in the axial direction.

A front surface of the first radial extension portion 2281*a* may be arranged to face the first diffuser 214*a* of the first impeller casing 211, and a rear surface of the first radial extension portion 2281*a* may be arranged to face the second radial extension portion 2281*b*.

A front surface of the second radial extension portion 2281*b* may be arranged to face the rear surface of the first radial extension portion 2281*a*, and a rear surface of the second radial extension portion 2281*b* may be arranged to face the first thrust bearing 2271 or the thrust runner 229.

The axial connection portion 2281*c* may extend in the axial direction, to connect the first radial extension portion 2281*a* and the second radial extension portion 2281*b*. A first journal bearing may be mounted on an inner circumferential surface of the axial connection portion 2281*c*.

The bypass passage 237 may be configured with a first bypass passage 2371 and a second bypass passage 2372.

The first bypass passage 2371 may be provided in the first radial extension portion 2281*a*. The first bypass passage 2371 may extend axially in the first radial extension portion 2281*a*. The first bypass passage 2371 may be formed axially through the first radial extension portion 2281*a*.

The second bypass passage 2372 may be provided in the second radial extension portion 2281*b*. The second bypass passage 2372 may extend axially to the second radial extension portion 2281*b*. The second bypass passage 2372 may be formed axially through the second radial extension portion 2281*b*.

The first bypass passage 2371 and the second bypass passage 2372 may be arranged in a line along the axial direction.

One side of the first bypass passage 2371 may be directly connected to communicate with the first diffuser 214*a* of the first impeller casing 211 or indirectly connected to communicate with the first diffuser 214*a* of the first impeller casing 211 through a communication passage 2373. In the embodiment disclosed herein, one side of the first bypass passage 2371 is shown connected to communicate with the second diffuser 214a, 214b of the first impeller casing 211 through the communication passage 2373.

The communication passage 2373 may be formed axially through the first radial sealing portion 230. One side of the communication passage 2373 may be connected to communicate with the first diffuser 214a of the first impeller casing 211, and another side of the communication passage 2373 may communicate with one side of the first bypass passage 2371.

The communication passage 2373 may be omitted when the first radial sealing portion 230 is formed integrally with the first bearing housing 2281. Alternatively, the first bypass passage 2371 may extend further to where the connection passage 2373 has been located.

Another side of the first bypass passage 2371 may be connected to communicate with the first space 217 of the housing.

One side of the second bypass passage 2372 may be arranged axially to face the another side of the first bypass passage 2371 and may be connected to communicate with the first space 217 of the housing. Another side of the second bypass passage 2372 may be connected to communicate with the first thrust bearing 2271 or the gap between the first thrust bearing 2271 and the thrust runner 229.

According to this configuration, the bypass passage 237 may communicate the first diffuser 214a and the inside of the housing, so that some of refrigerant moving to the first diffuser 214a are bypassed to the inside of the housing through the bypass passage 237.

Internal pressure of the first diffuser 214a may decrease and internal pressure of the housing may increase. In particular, pressure of the gap between the first thrust bearing 2271 and the thrust runner 229 may increase.

Accordingly, the first diffuser 214a and the inside of the housing may achieve pressure equilibrium through the bypass passage 237.

In addition, an oil film formed in the gap between the first thrust bearing 2271 and the thrust runner 229 may not be damaged and the gap may be constantly maintained. The oil film may perform a lubricating function at a boundary between the thrust bearing 227 and the thrust runner 229.

In addition, refrigerant transferred through the bypass passage 237 may perform a lubricating function between the thrust bearing 227 and the thrust runner 229.

The refrigerant transferred through the bypass passage 237 may reduce a thrust transferred through the thrust runner 229.

The opening and closing valve 238 may be mounted on the first diffuser 214a or the first bearing housing 2281. In the embodiment disclosed herein, the opening and closing valve 238 is shown mounted on the first bearing housing 2281.

The opening and closing valve 238 may be configured to open and close the bypass passage 237.

The opening and closing valve 238 may be arranged adjacent to the first bypass passage 2371 to open and close the first bypass passage 2371.

The opening and closing valve 238 may move between a first position where it closes the bypass passage 237 and a second position where it opens the bypass passage 237. The opening and closing valve 238 may be configured to perform linear motion or rotary motion. This embodiment illustrates a case where the opening and closing valve 238 is configured to perform rotary motion.

The opening and closing valve 238 may selectively open and close the bypass passage 237. For example, the opening and closing valve 238 may be actuated when high pressure refrigerant or liquid refrigerant flows into the diffuser 214a, 214b and a large axial load is applied accordingly.

The opening and closing valve 238 may open the bypass passage 237 when a large axial load is applied, and close the bypass passage 237 when axial loads applied to both ends of the rotary shaft 219 are balanced.

The opening and closing valve 238 may be configured to be actuated through contact with the thrust runner 229.

That is, the opening and closing valve 238 may use the axial movement of the thrust runner 229 as a power source.

To this end, the opening and closing valve 238 may include a valve link 239.

One side of the valve link 239 may be coupled to one side of the opening and closing valve 238, and another side of the valve link 239 may be spaced apart from the thrust runner 229 with a gap therebetween to be contactable with the front surface of the thrust runner 229.

The valve link 239 may include a link body 2391 and a valve coupling portion 2392.

The link body 2391 may be formed in a cylindrical shape.

The valve coupling portion 2392 may protrude toward the opening and closing valve 238 from one side surface of the link body 2391. The valve coupling portion 2392 may be formed in various shapes, such as a cylindrical shape or a rectangular shape.

A diameter of the link body 2391 may be larger than a diameter of the valve coupling portion 2392.

This may increase a contactable area of the link body 2391 with the thrust runner 229.

The valve coupling portion 2392 may be fastened to one side of the opening and closing valve 238 by a connection pin 240.

The first bearing housing 2281 may include a valve receiving portion 242. The valve receiving portion 242 may be formed axially through the first radial extension portion 2281a.

A valve guide groove 243 may be formed on a lower side of the valve receiving portion 242. The valve guide groove 243 may be formed to communicate with the space of the valve receiving portion 242 and the bypass passage 237.

The valve guide groove 243 may be formed to correspond to a trajectory of a path along which the another side of the opening and closing valve 238 rotates.

Through this, the valve guide groove 243 may avoid interference between the first bearing housing 2281 and the opening and closing valve 238. The valve guide groove 243 may not only guide the rotation of the opening and closing valve 238, but also minimize refrigerant leakage through the bypass passage 237.

The opening and closing valve 238 may include a valve body 2381 and a passage opening and closing portion 2382.

The valve body 2381 may define the body of the opening and closing valve 238. A fastening hole 2383 may be formed in one side of the valve body 2381. A connection pin 240 may be coupled to the fastening hole 2383. The fastening hole 2383 may be formed so that a length thereof in the radial direction (a direction perpendicular to the axial direction) is longer than an axial width to allow for upper and lower clearance of the connection pin 240.

The valve body 2381 may include a hinge hole to which a hinge pin 241 is fastened.

One side of the hinge pin 241 may be hinge-coupled to the hinge hole of the valve body 2381, and another side of the hinge pin 241 may be fastened to the inside of the valve receiving portion 242 of the first bearing housing 2281.

A torsion spring 244 may be disposed on the hinge pin 241. The torsion spring 244 may be formed in a helical coil shape. However, the disclosure is not limited to the torsion spring 244, and elastic members of different structures may be applied to return the opening and closing valve 238 to its original position.

The torsion spring 244 may be mounted on the hinge pin 241 so that the hinge pin 241 is inserted into the inside of the torsion spring 244.

One end of the torsion spring 244 may be fastened to the hinge pin 241, and another end of the torsion spring 244 may be fastened to the first bearing housing 2281.

According to this configuration, the torsion spring 244 may store elastic force when the opening and closing valve 238 rotates around the hinge pin 241 from a closing position to an opening position, and move the opening and closing valve 238 to its original position (the closing position) by the elastic force when the axial load acting on the opening and closing valve 238 is released.

The passage opening and closing portion 2382 may be formed on the another side of the valve body 2381. The passage opening and closing portion 2382 may be formed in a triangular shape or a conical shape. The passage opening and closing portion 2382 may open and close the bypass passage 237 and may be formed in various shapes.

To minimize refrigerant leakage, it may be desirable to minimize the size and cross-sectional area of the passage opening and closing portion 2382.

A distance between one end (facing the fastening hole 2383) of the opening and closing valve 238 and the hinge pin 241 may be shorter than a distance between another end (the passage opening and closing portion 2382) of the opening and closing valve 238 and the hinge pin 241.

Through this, even when a movement distance (rotation angle) of one end portion of the opening and closing valve 238 is short (small), a movement distance (rotation angle) of another end (the passage opening and closing portion 2382) of the opening and closing valve 238 may increase. This may improve sensitivity and response speed of the opening and closing valve 238.

The opening and closing valve 238 may be configured to be selectively contactable with the thrust runner 229 through the valve link 239. The valve link 239 may be disposed at a preset gap from the thrust runner 229 to face the same.

The gap between the valve link 239 and the thrust runner 229 may be smaller than or equal to the gap between the first thrust bearing 2271 and the thrust runner 229. In the embodiment disclosed herein, the gap between the valve link 239 and the thrust runner 229 is shown to be smaller than the gap between the first thrust bearing 2271 and the thrust runner 229.

According to this configuration, when the thrust runner 229 moves in the axial direction, the thrust runner 229 may first come into contact with the valve link 239 before coming into contact with the first thrust bearing 2271.

An actuation start time of the opening and closing valve 238 may be the same as the time when the contact is made between the valve link 239 and the thrust runner 229.

Accordingly, when abnormal behavior of the rotary shaft occurs due to an abnormal operation, for example, when high-pressure refrigerant or liquid refrigerant flows into the diffuser 214*a*, 214*b* and thereby a large axial load is applied, the opening and closing valve 238 may quickly respond to the axial load transmitted through the thrust runner 229.

The opening and closing valve 238 does not require an electrical power source (electrical energy) such as a motor for actuating the opening and closing valve 238*a* as well as a separate detection member for detecting the abnormal behavior of the rotary shaft 219.

In addition, as the axial movement distance of the thrust runner 229 increases, the rotation angle of the opening and closing valve 238 may increase and the rotation speed may become fast, so the sensitivity of the opening and closing valve 238 may be improved.

(3) Thrust Bearing Safety Device 2

Figure 23:
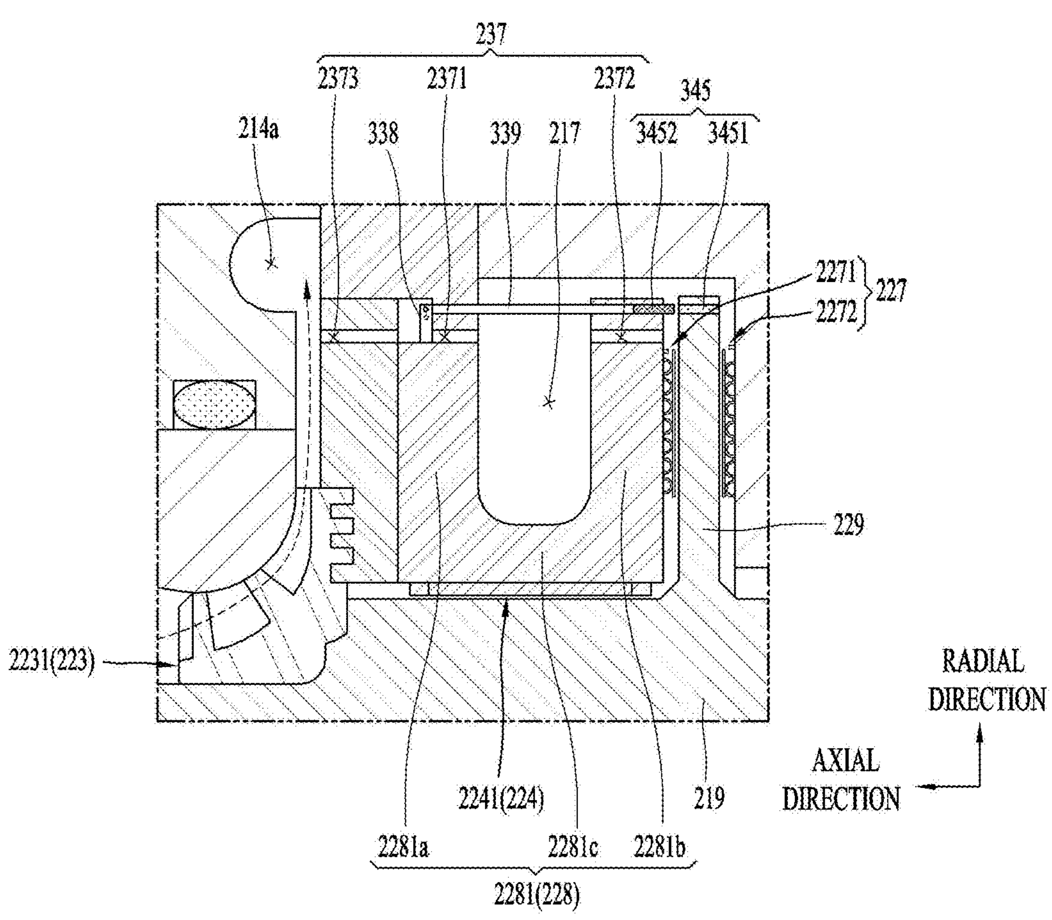
FIG. 23 is a conceptual view of a thrust bearing safety device 2 according to another embodiment before operation.

FIG. 23 is a conceptual view of a thrust bearing safety device 2 according to another embodiment before operation.

Figure 24:
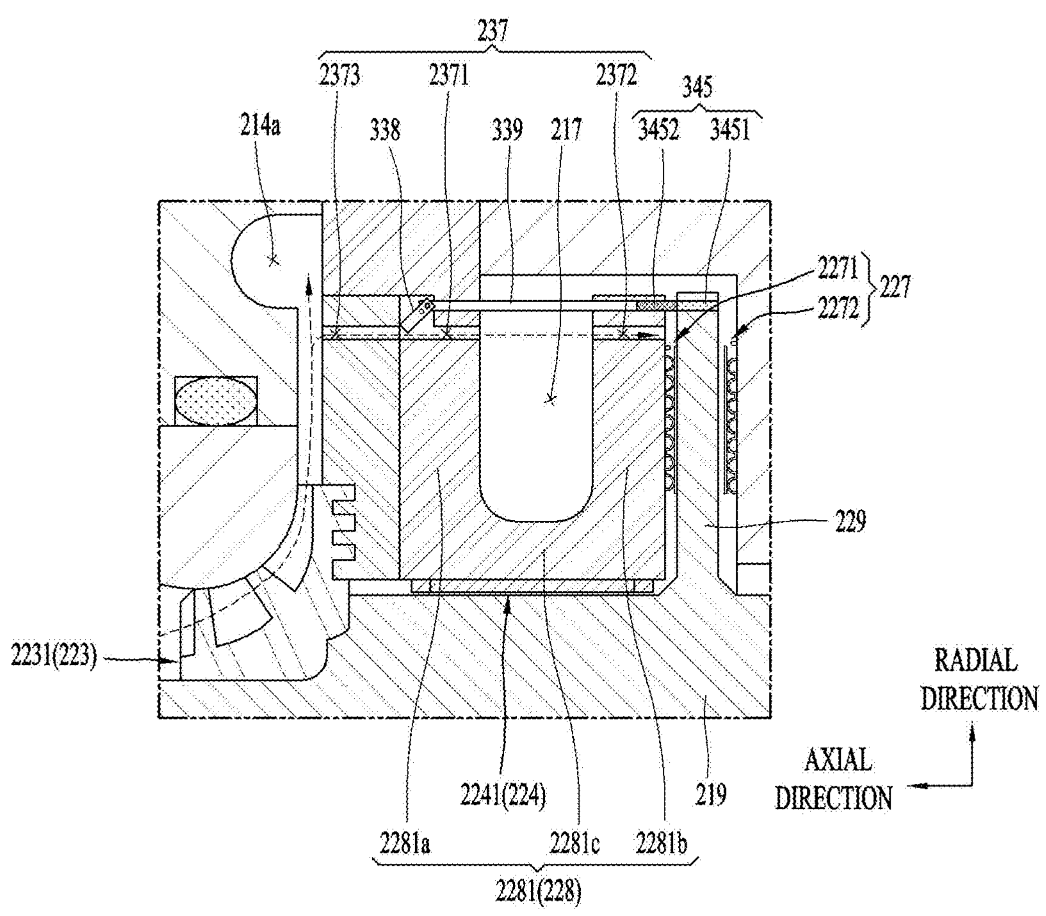
FIG. 24 is a conceptual view of the thrust bearing safety device 2 in FIG. 23 after operation.

FIG. 24 is a conceptual view of the thrust bearing safety device 2 in FIG. 23 after operation.

This embodiment differs from the embodiments of FIGS. 13 to 22 in that the opening and closing valve 338 is actuated using magnetic force of a magnet 345.

The opening and closing valve 338 may include a valve link 339. The valve link 339 may connect the opening and closing valve 338 and the thrust runner 229. One side of the valve link 339 may be coupled with the opening and closing valve 338, and another side of the valve link 339 may be spaced apart from the thrust runner 229 with a certain gap.

The gap between the another end of the valve link 339 and the thrust runner 229 may be smaller than or equal to the gap between the first thrust bearing 2271 and the thrust runner 229. In the embodiment disclosed herein, the gap between the another end of the valve link 339 and the thrust runner 229 is shown to be smaller than the gap between the first thrust bearing 2271 and the thrust runner 229.

A first magnet 3451 may be mounted on the thrust runner 229. The first magnet 3451 may be arranged axially in a line to be spaced apart from the valve link 339. A first magnet mounting groove may be formed in the thrust runner 229. The first magnet mounting groove may be arranged to face the valve link 339 in the axial direction.

One side of the first magnet 3451 may be exposed outside the thrust runner 229 toward the valve link 339. The exposed one side surface of the first magnet 3451 may be flush with the front surface of the thrust runner 229.

A second magnet 3452 may be mounted on another side of the valve link 339. The second magnet 3452 may be arranged axially to face the first magnet 3451. A second magnet mounting groove in which the second magnet 3452 is mounted may be formed in the another side of the valve link 339.

The second magnet mounting groove may be formed to be open in a direction toward the first magnet 3451.

One side surface of the second magnet 3452 may be exposed toward the first magnet 3451. The exposed one side surface of the second magnet 3452 may be flush with the end surface of the valve link 339.

The first magnet 3451 and the second magnet 3452 may be configured to exert an attractive force on each other.

However, the second magnet 3452 may be optionally applied to the valve link 339.

For example, when the valve link 339 is formed of a metal material, an attractive force may be applied between the first magnet 3451 and the valve link 339, so the second magnet 3452 may be omitted. When the valve link 339 is formed of a non-metal material on which no magnetic force acts, the second magnet 3452 may be applied.

The first magnet 3451 and the second magnet 3452 may be arranged apart from each other with a preset gap.

The preset gap between the first magnet 3451 and the second magnet 3452 may be formed to be greater than a distance at which the magnetic force (attractive force) is applicable between the magnets 345 at a neutral position of the thrust runner 229.

Here, the neutral position of the thrust runner 229 may refer to that a radial center line of the thrust runner 229 is located at a half (½) point of the axial distance between the first thrust bearing 2271 and the second thrust bearing 2272.

That is, when the distance between the first thrust bearing 2271 and the thrust runner 229 is equal to the distance between the second thrust bearing 2272 and the thrust runner 229, the thrust runner 229 may be located at the neutral position.

When a separation distance between the first magnet 3451 and the second magnet 3452 is shorter than or equal to a distance at which a magnetic force is applied between the magnets 345, the opening and closing valve 338 may always be actuated by the attractive force between the first magnet 3451 and the second magnet 3452 even though the axial load of the thrust runner 229 is not applied by being biased in one direction. Therefore, the opening and closing valve 338 may be open even under normal conditions.

The axial load of the thrust runner 229 acting in the one direction may refer to that the axial load of the thrust runner 229 acts from the second impeller 2232 toward the first impeller 2231.

The distance at which the magnetic force acts between the first magnet 3451 and the second magnet 3452 may be shorter than the distance between the first thrust bearing 2271 and the thrust runner 229.

The gap between the first magnet 3451 and the second magnet 3452 may be larger than the gap between the first thrust bearing 2271 and the thrust runner 229.

One side of the opening and closing valve 338 may be coupled to the valve link 339 by a connection pin.

The passage opening and closing portion may be disposed on another side of the opening and closing valve 338, to open and close the bypass passage 237. The another side of the opening and closing valve 338 may be positioned lower than the one side of the opening and closing valve 338.

The hinge pin may be arranged between the one side and the another side of the opening and closing valve 338.

The passage opening and closing portion of the opening and closing valve 338 may be positioned lower than the hinge pin.

Hereinafter, the actuating status of the opening and closing valve 338 will be described.

When high-pressure refrigerant or liquid refrigerant is suctioned into the diffuser 214*a*, 214*b*, the rotary shaft 219 may move abnormally in the axial direction toward the first impeller 2231.

To cope with this, when the thrust runner 229 moves axially, the gap between the first magnet 3451 and the second magnet 3452 may become narrower than a distance at which magnetic force may act between the first magnet 3451 and the second magnet 3452.

In this instance, the valve link 339 may move to the first magnet 3451 by attractive force between the first magnet 3451 and the second magnet 3452.

The opening and closing valve 338 may rotate around the hinge pin to open the bypass passage 237.

A portion of high-pressure refrigerant or liquid refrigerant, which flows into the first diffuser 214*a*, may be introduced into the housing through the bypass passage 237, so that pressure inside the first diffuser 214*a* and the housing may be equalized.

The high-pressure refrigerant or liquid refrigerant may flow into the first thrust bearing 2271 along the bypass passage 237 and form an oil film between the first thrust bearing 2271 and the thrust runner 229.

The high-pressure refrigerant, etc. may also offset the axial load of the thrust runner 229 that is biased in one direction.

As the axial load of the thrust runner 229 is offset, the torsion spring 244 mounted on the hinge pin of the opening and closing valve 338 may return to its original position by overcoming the attractive force of the magnet 345 by using its elastic force.

Since other components are the same as or similar to those in the embodiment of FIGS. 13 to 22, a redundant description will be omitted.

(4) Thrust Bearing Safety Device 3

Figure 25:
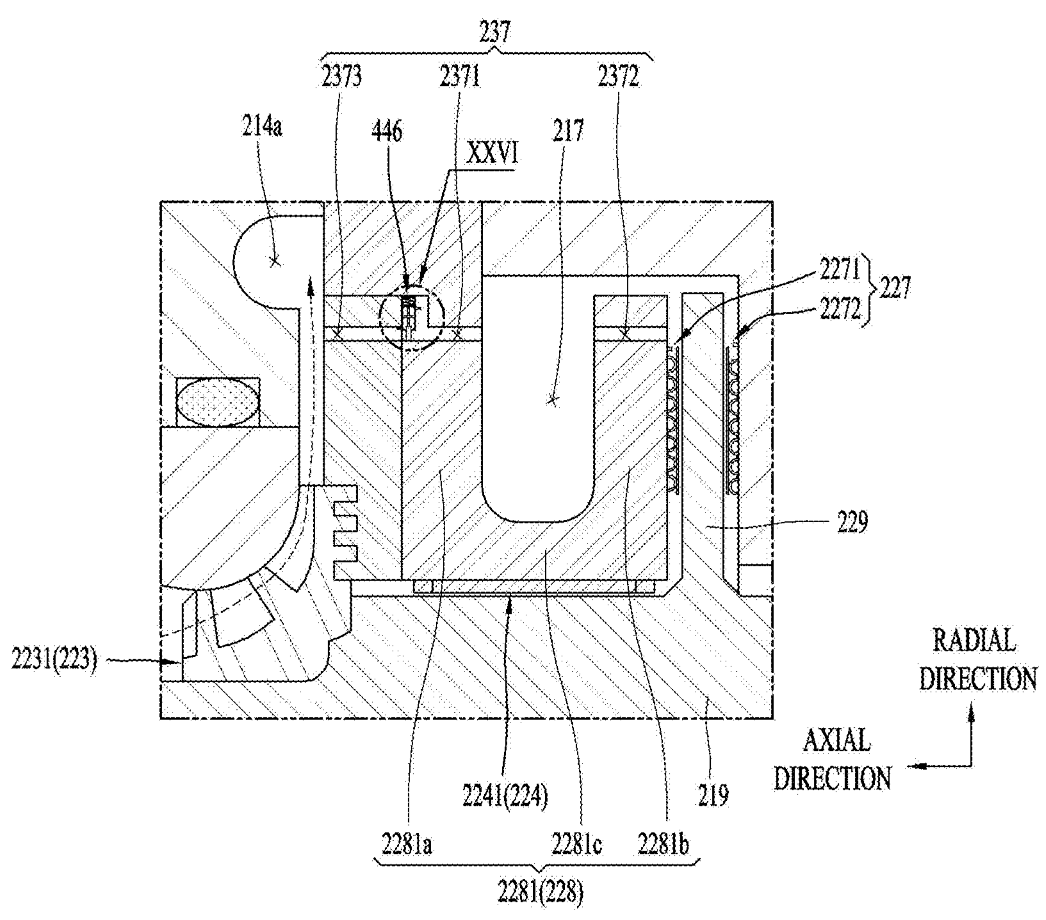
FIG. 25 is a conceptual view of a thrust bearing safety device 3 according to still another embodiment.

FIG. 25 is a conceptual view of a thrust bearing safety device 3 according to still another embodiment.

Figure 26:
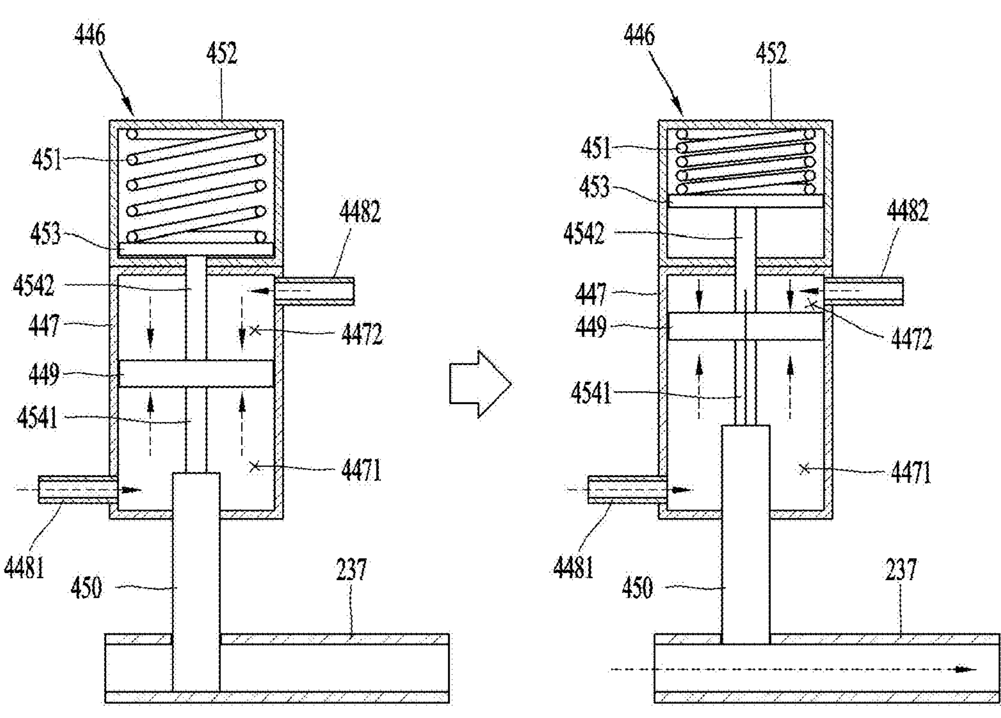
FIG. 26 is a conceptual view for explaining an operating state of the thrust bearing safety device 3 by enlarging a part XXVI in FIG. 25.

FIG. 26 is a conceptual view for explaining an operating state of the thrust bearing safety device 3 by enlarging a part XXVI in FIG. 25.

This embodiment differs from the embodiments of FIGS. 13 to 24 described above in that the bypass passage 237 is open and closed using a differential pressure valve 446.

The differential pressure valve 446 may be disposed in the diffuser part 111*b* of the first impeller casing 211 or the first bearing housing 2281. In the embodiment disclosed herein, the differential pressure valve 446 is shown mounted on the first bearing housing 2281.

The differential pressure valve 446 may be configured to selectively open and close the bypass passage 237.

The differential pressure valve 446 may include a valve housing 447, a diaphragm 449, an opening and closing plunger 450, and a return spring 451.

The valve housing 447 may be formed in a hollow cylindrical shape. A diaphragm 449, a plurality of connection rods 4541 and 4542, and an opening and closing plunger 450 may be received inside the valve housing 447.

The diaphragm 449 may divide a receiving space inside the valve housing 447 into a first receiving portion 4471 and a second receiving portion 4472. The diaphragm 449 may be installed to be slidable along the longitudinal direction inside the valve housing 447 depending on a pressure difference between the first receiving portion 4471 and the second receiving portion 4472.

A first communication port 4481 may be formed in one side of the valve housing 447. One side of the first communication port 4481 may be connected to communicate with the first diffuser 214*a* of the first impeller casing 211, and another side of the first communication port 4481 may be connected to communicate with the first receiving portion 4471 of the valve housing 447.

According to this configuration, high-pressure refrigerant suctioned into the first diffuser 214*a* may flow into the first receiving portion 4471 of the valve housing 447 through the first communication port 4481.

A second communication hole 4482 may be formed in another side of the valve housing 447. One side of the second communication port 4482 may be connected to communicate with the second receiving portion 4472 of the valve housing 447, and another side of the second communication port 4482 may be connected to communicate with the first space 217 of the housing.

According to this configuration, refrigerant introduced into the first space 217 of the housing may flow into the second receiving portion 4472 of the valve housing 447 through the second communication port 4482.

Volumes of the first receiving portion 4471 and the second receiving portion 4472 may vary depending on a sliding direction of the diaphragm 449.

The opening and closing plunger 450 may be formed in a cylindrical shape. The opening and closing plunger 450 may be slidably coupled to the valve housing 447 to be drawn out of the valve housing 447 or inserted into the first receiving portion 4471 of the valve housing 447.

The opening and closing plunger 450 may be connected to the diaphragm 449 by the first connection rod 4541. The opening and closing plunger may move in the longitudinal direction of the valve housing 447 together with the diaphragm 449 according to a pressure difference between the first receiving portion 4471 and the second receiving portion 4472.

A spring housing 452 may be disposed above the valve housing 447.

The return spring 451 may be received inside the spring housing 452. A pressing plate 453 may be coupled to be slidable along the longitudinal direction of the spring housing 452.

The return spring 451 may be disposed between the pressing plate 453 and an inner surface of the spring housing 452.

The pressing plate 453 may be configured to press the return spring 451.

The return spring 451 may return the pressing plate 453 to its original position by elastic force when pressing force of the pressing plate 453 is released.

The second connection rod 4542 may be formed to extend vertically through the valve housing 447 and the spring housing 452. The second connection rod 4542 may connect the diaphragm 449 and the pressing plate 453.

The pressing plate 453 may move vertically together with the diaphragm 449.

Hereinafter, the actuating status of the differential pressure valve 446 will be described.

Pressure of refrigerant suctioned into the first diffuser 214*a* may be higher than pressure of refrigerant inside the first space 217 of the housing.

In this instance, pressure of refrigerant flowing from the first diffuser 214*a* into the first receiving portion 4471 through the first communication port 4481 may be greater than pressure of refrigerant flowing from the first space 217 of the housing into the second receiving portion 4472 through the second communication port 4482.

The diaphragm 449 may move upward due to a pressure difference between the first receiving portion 4471 and the second receiving portion 4472.

The opening and closing plunger 450 may move upward together with the diaphragm 449, thereby opening the bypass passage 237.

The pressing plate 453 may also move upward together with the diaphragm 449 and press the return spring 451.

The return spring 451 may be compressed by receiving pressing force from the pressing plate 453.

High-pressure refrigerant may move into the housing through the bypass passage 237, so that the first diffuser 214*a* and the inside of the housing may achieve pressure equilibrium.

The refrigerant moving along the bypass passage 237 may maintain an oil film between the first thrust bearing 2271 and the thrust runner 229.

When liquid refrigerant flows into the first diffuser 214*a*, some of the liquid refrigerant may move to the bypass passage 237, thereby reducing an amount of liquid refrigerant that is suctioned into the first diffuser 214*a*.

When pressure equilibrium is achieved between the first diffuser 214*a* and the inside of the housing, the first receiving portion 4471 and the second receiving portion 4472 may also achieve pressure equilibrium therebetween.

As the pressure difference between the first and second receiving portions 4471 and 4472 disappears, the pressing force of the pressing plate 453 may also be released, and the diaphragm 449 may move downward to its original position by the elastic force of the return spring 451.

The opening and closing plunger 450 may move downward together with the diaphragm 449, thereby closing the bypass passage 237.

Since other components are the same as or similar to those in the embodiment of FIGS. 13 to 24, a redundant description will be omitted.

(5) Thrust Bearing Safety Device 4

Figure 27:
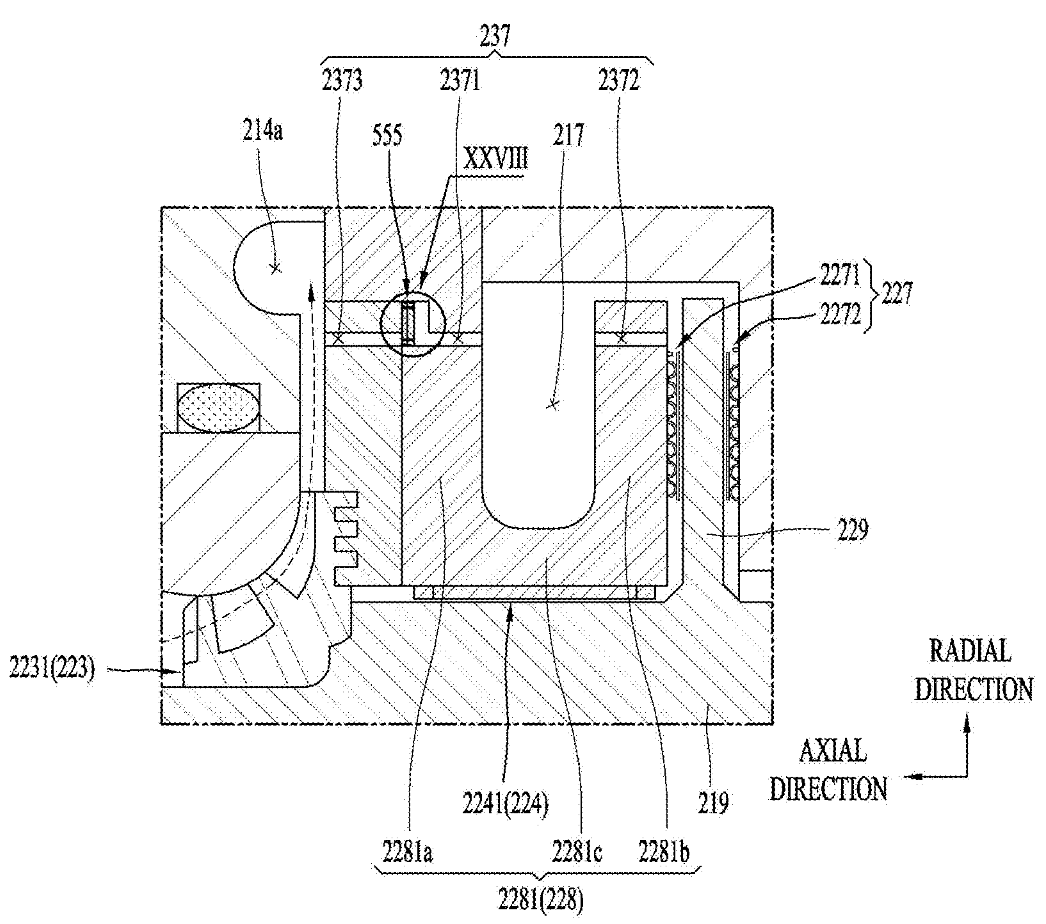
FIG. 27 is a conceptual view of a thrust bearing safety device 4 according to still another embodiment.

FIG. 27 is a conceptual view of a thrust bearing safety device 4 according to still another embodiment.

Figure 28:
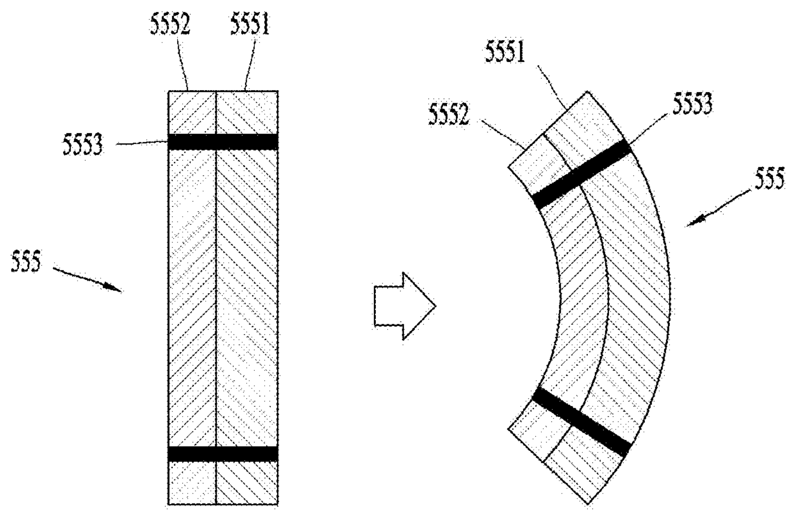
FIG. 28 is a conceptual view for explaining an operating state of the thrust bearing safety device 4 by enlarging a part XXVIII in FIG. 27.

FIG. 28 is a conceptual view for explaining an operating state of the thrust bearing safety device 4 by enlarging a part XXVIII in FIG. 27.

This embodiment differs from the embodiments of FIGS. 13 to 26 described above in that the bypass passage 237 is open and closed using a bimetal valve 555.

The bimetal valve 555 may be disposed in the diffuser part 111*b* of the first impeller casing 211 or the first bearing housing 2281. In the embodiment disclosed herein, the bimetal valve 555 is shown mounted inside the first bearing housing 2281.

The bimetal valve 555 may include a first bimetal 5551, a second bimetal 5552, and a connection band 5553.

The first bimetal 5551 and the second bimetal 5552 may be made of a metal material. The first bimetal 5551 and the second bimetal 5552 may have different thermal expansion coefficients.

The first bimetal 5551 may have a greater thermal expansion coefficient than the second bimetal 5552.

The first bimetal 5551 may be arranged toward the first diffuser 214*a*. The second bimetal 5552 may be arranged toward the inside of the housing. The first bimetal 5551 and the second bimetal 5552 may be arranged to overlap each other in the axial direction.

The connection band 5553 may be provided in plurality. The plurality of connection bands 5553 may connect both sides of the first bimetal 5551 and the second bimetal 5552, respectively.

The connecting band 5553 may be configured to allow the corresponding bimetal 5551, 5552 to be thermally expanded in the longitudinal direction while suppressing the bimetal from being separated.

One side of each of the first and second bimetals 5551 and 5552 may be fixed to the inner surface of the first bearing housing 2281. Another end of each of the first and second bimetals 5551 and 5552 may be formed as a free end.

The another side of each of the first and second bimetals 5551 and 5552 may be configured to open and close the bypass passage 237.

The bimetal valve 555 may be actuated depending on a preset temperature of refrigerant.

Hereinafter, the actuating status of the bimetal valve 555 will be described.

High-temperature and high-pressure refrigerant may be suctioned into the first diffuser 214*a*.

The bimetal valve 555 may be positioned toward the first diffuser 214*a* and receive heat from the refrigerant suctioned into the first diffuser 214*a*.

The first bimetal 5551 may have a greater thermal expansion coefficient than the second bimetal 5552, so the first bimetal 5551 may be expanded in length more than the second bimetal 5552.

Due to this, the first bimetal 5551 may be curved toward the second bimetal 5552.

Therefore, the bimetal valve 555 may open the bypass passage 237.

Also, when the temperature of the refrigerant suctioned into the first diffuser 214*a* drops below the preset temperature, the bimetal valve 555 may return to its original position to close the bypass passage 237 again.

Since other components are the same as or similar to those in the embodiment of FIGS. 13 to 26, a redundant description will be omitted.

(6) Thrust Bearing Safety Device 5

Figure 29:
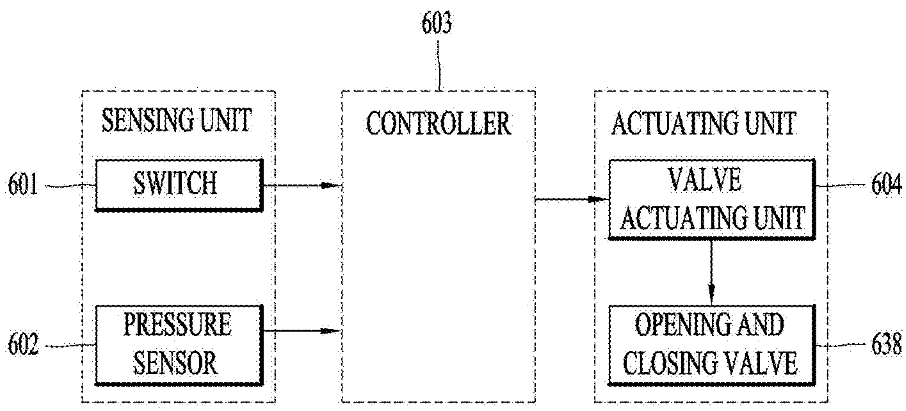
FIG. 29 is a conceptual view of a thrust bearing safety device 5 according to still another embodiment.

FIG. 29 is a conceptual view of a thrust bearing safety device 5 according to still another embodiment.

This embodiment differs from the foregoing embodiments illustrated in FIGS. 13 to 28 in that an opening and closing valve 638 is configured in an electrical manner.

An electric opening and closing valve 638 according to the embodiment may be actuated using electric energy. For example, the opening and closing valve 638 may be actuated by receiving power from a motor part such as a small motor.

In the embodiment, a detection member such as a switch 601 may be disposed on one end portion of the valve link. The switch 601 may output an electrical signal in response to a contact. The switch 601 may be mounted on the one end portion of the valve link to face the thrust runner 229.

The detection member may be implemented as a pressure sensor 602. The pressure sensor 602 may be disposed between the thrust runner 229 and the first thrust bearing 2271. The pressure sensor 602 may be configured to detect pressure between the thrust runner 229 and the first thrust bearing 2271.

A controller 603 may control the actuation of the opening and closing valve 638 by receiving a detection signal from the switch 601 or the pressure sensor 602.

Hereinafter, a method of controlling the electric opening and closing valve 638 will be described.

The switch 601 may detect a contact or non-contact with the thrust runner 229, or the pressure sensor 602 may measure pressure between the thrust runner 229 and the first thrust bearing 2271.

When the switch 601 comes into contact with the thrust runner 229 or a measured pressure value is greater than a preset pressure value, the actuation of the opening and closing valve 638 may be initiated.

The controller 603 may actuate the opening and closing valve 638 by receiving a detection signal from the switch 601 or the pressure sensor 602.

The opening and closing valve 638 may open and close the bypass passage 237 by receiving power from a valve actuating unit.

Since other components are the same as or similar to those in the embodiment of FIGS. 13 to 28, a redundant description will be omitted.

As such, according to the disclosure, the bypass passage 237 may be formed to connect the diffuser 214*a*, 214*b* of the impeller casing 110 and the inside of the housing in a communicating manner. The bypass passage 237 may bypass some of high-pressure refrigerant or liquid refrigerant, which flows into the compression part (the diffuser 214*a*, 214*b*), to be delivered into the housing 200.

This may achieve pressure equilibrium between the diffuser 214*a*, 214*b* and the housing 200, thereby minimizing a difference between axial pressure on the side of the first impeller 2231 and axial pressure on the side of the second impeller 2232.

Some of the bypassed refrigerant may form an oil film between the thrust bearing 227 and the thrust runner 229. Through this, the bypassed refrigerant may lubricate the thrust bearing 227, thereby suppressing damage to the thrust bearing 227, which is caused by the axial load acting on the rotary shaft 219.

When liquid refrigerant flows into the diffuser 214*a*, 214*b*, the bypass passage 237 may bypass some of the liquid refrigerant to flow into the housing 200, thereby minimizing the introduction of the liquid refrigerant into the compression part (the diffuser 214*a*, 214*b*).

The bypass passage 237 and the opening and closing valve 238, 338, 638 for opening and closing the same may be installed inside the diffuser 214*a*, 214*b* or the bearing housing 228, which may result in reducing the number of components, contributing to miniaturization, and reducing manufacturing costs.

Since the opening and closing valve 238, 338, 638 is actuated through a mechanical mechanism by contact with the thrust runner 229 along with an axial movement of the rotary shaft 219, a structure may be simplified and an installation space may be minimized.

By employing a structure in which only the opening and closing valve 238, 338, 638 and the valve link 239, 339 are additionally mounted and assembled inside the bearing housing 228, an advantage of easy assembly and disassembly may be obtained.

Bypassed refrigerant may move in an opposite direction to a moving direction of the rotary shaft 219, thereby offsetting axial force. This may provide an advantage of allowing easy alignment between the thrust bearing 227 and the rotary shaft 219 without the need of additional components.

The invention claimed is:

1. A turbo compressor, comprising:

a housing;

a rotary shaft rotatably mounted inside the housing;

an impeller configured to rotate by being coupled to the rotary shaft;

a bearing configured to rotatably support the rotary shaft; and a bearing housing coupled to the housing and configured to support the bearing;

an impeller casing that receives the impeller therein, and comprising a diffuser that extends spirally from one side of the impeller to compress refrigerant suctioned by the impeller; and a bypass passage formed between an inside of the diffuser and an inside of the housing, so that a portion of refrigerant flowing into the diffuser is bypassed to the inside of the housing, wherein the bearing comprises:

a journal bearing comprising a gas foil bearing mounted on an inner circumferential surface of the bearing housing, surrounding the rotary shaft, and spaced apart from the rotary shaft with an air gap, the journal bearing supporting a radial load of the rotary shaft; and a journal bearing safety device disposed in the bearing housing, and configured to limit a radial movement distance of the rotary shaft to within an elastic deformation range of the journal bearing, wherein the journal bearing safety device comprises a stopper formed to protrude toward the rotary shaft from the inner circumferential surface of the bearing housing, wherein an opening and closing valve is installed on one side of the bypass passage, and wherein the opening and closing valve is configured to open and close the bypass passage.

2. The turbo compressor of claim 1, wherein the gas foil bearing comprises:

a bump foil comprising a plurality of curved portions formed convexly toward the rotary shaft, and a connecting portion connecting the plurality of curved portions adjacent to each other; and a cover foil arranged to cover an inside of the bump foil.

3. The turbo compressor of claim 2, wherein the stopper is formed to extend in a circumferential direction along the inner circumferential surface of the bearing housing.

4. The turbo compressor of claim 3, wherein the journal bearing further comprises a bump detachment suppression ring disposed on one side of the gas foil bearing and configured to suppress the gas foil bearing from being axially detached, and the gas foil bearing is arranged between the bump detachment suppression ring and the stopper.

5. The turbo compressor of claim 4, wherein the bump foil having a bump height to a vertex of the curved portion radially inward from the inner circumferential surface of the bearing housing, and a protrusion height of the stopper is lower than the bump height and higher than a height of the bump detachment suppression ring protruding toward the rotary shaft based on the inner circumferential surface of the bearing housing.

6. The turbo compressor of claim 3, wherein the stopper comprises:

a first stopper disposed on one axial side of the journal bearing; and a second stopper disposed on another axial side of the journal bearing.

7. The turbo compressor of claim 1, further comprising a thrust runner protruding radially from the rotary shaft, wherein the bearing further comprises a thrust bearing comprising a gas foil bearing spaced apart from the thrust runner with an air gap, and configured to support an axial load of the rotary shaft, and wherein the bypass passage is formed through the bearing housing, and configured such that one side thereof communicates with the diffuser and another side communicates with the inside of the housing.

8. The turbo compressor of claim 7, wherein one side of the bypass passage communicates with the diffuser, and another side of the bypass passage communicates with the thrust bearing.

9. The turbo compressor of claim 7, wherein the bearing housing comprises:

an axial connection portion formed to surround the rotary shaft;

a first radial extension portion extending radially from one side of the axial connection portion; and a second radial extension portion extending radially from another side of the axial connection portion, and the bypass passage is formed through the first radial extension portion, wherein the bypass passage comprises:

a first bypass passage formed through the first radial extension portion in one direction; and a second bypass passage formed through the second radial extension portion in the one direction.

10. The turbo compressor of claim 9, wherein a diameter of the second bypass passage is greater than or equal to a diameter of the first bypass passage.

11. The turbo compressor of claim 1, further comprising a valve link having one side coupled with the opening and closing valve, another side spaced apart from the rotary shaft to be contactable with the rotary shaft, the valve link transmitting axial movement power of the rotary shaft to the opening and closing valve when the rotary shaft moves in the axial direction.

12. The turbo compressor of claim 11, wherein a gap between the valve link and the thrust runner is smaller than or equal to the gap between the thrust bearing and the thrust runner.

13. The turbo compressor of claim 1, wherein the opening and closing valve comprises: a valve body having a passage opening and closing portion formed on one end thereof to open and close the bypass passage; a valve link rotatably connected to another end of the valve body, and brought into contact with the thrust runner when the thrust runner moves axially, to transfer axial movement power of the thrust runner to the another end of the valve body; and a hinge pin hinge-coupled between the one end and the another end of the valve body to serve as a central axis for rotation of the valve body.

14. The turbo compressor of claim 13, further comprising an elastic member mounted on the hinge pin so that the valve body returns to an original position thereof, wherein the elastic member is a torsion spring, one end of which is coupled to the bearing housing and another end of which is coupled to the rotary shaft.

15. The turbo compressor of claim 11, wherein the opening and closing valve is open and closed by using magnetic force of magnets mounted on an end portion of the valve link and the thrust runner facing the end portion, respectively, or wherein the opening and closing valve is a differential pressure valve actuated by a pressure difference between the diffuser and the inside of the housing, or wherein the opening and closing valve is a bimetal valve actuated according to temperature of refrigerant suctioned into the diffuser.

16. The turbo compressor of claim 7, wherein the impeller comprises:

a first impeller rotatably coupled to one end of the rotary shaft; and a second impeller rotatably coupled to another end of the rotary shaft, the diffuser comprises:

a first diffuser configured to compress a working fluid suctioned through the first impeller; and a second diffuser configured to recompress the compressed working fluid suctioned from the first diffuser through the second impeller, and one side of the bypass passage communicates with the first diffuser, and another side of the bypass passage communicates with the inside of the housing.

* * * * *